United States Patent

Borck et al.

[15] 3,669,972
[45] June 13, 1972

[54] P-AMINOARYLALKANAL DERIVATIVES

[72] Inventors: Joachim Borck; Johann Dahm; Volker Koppe; Josef Kramer; Gustav Schorre; Jan Willem Hovy; Ernst Schorscher, all of Darmstadt, Germany

[73] Assignee: Merck Patent Gesellschaft mit beschrankter Haftung, Darmstadt, Germany

[22] Filed: Jan. 7, 1970

[21] Appl. No.: 1,310

Related U.S. Application Data

[63] Continuation-in-part of Ser. Nos. 746,326, July 22, 1968, and Ser. No. 845,076, July 25, 1969.

[30] Foreign Application Priority Data

Jan. 7, 1969  Germany................P 19 00 585.7

[52] U.S. Cl............260/293.73, 260/293.62, 260/293.8, 260/293.81, 260/326.5 S, 260/326.5 J, 260/239 B, 260/326.3, 260/293.72, 260/326.84, 260/326.8, 260/293.67, 260/348 A, 260/348 R, 260/326.5 D, 260/293.83, 260/293.84, 260/376.5 R, 260/578, 260/488 CD, 260/293.79, 260/293.76, 260/293.75, 260/340.9, 260/309, 260/293.7, 260/310 R, 260/315, 260/293.61, 260/239 E, 260/293.69, 260/326.85, 260/293.78, 260/293.64, 424/274, 424/244, 424/267
[51] Int. Cl.......................................................C07d 29/36
[58] Field of Search............260/326.5 S, 326.5 J, 294.7 J, 260/293.4 R, 239 B, 293.73, 293.62, 293.8, 293.81, 326.3

[56] References Cited

UNITED STATES PATENTS 3,317,538  5/1967  Freed et al......................260/294.7 J

OTHER PUBLICATIONS

Hackh's Chemical Dictionary 4th ed. (1969) page 16

Primary Examiner—Henry R. Jiles
Assistant Examiner—S. D. Winters
Attorney—Millen, Raptes & White and I. William Millen

[57] ABSTRACT p-Aminoarylaklanals of the formula

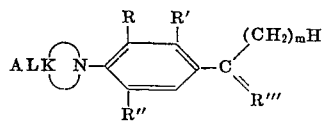

and the corresponding aldehydic functional derivatives thereof, wherein R and R' are H or, collectively, —CH = CH—CH = CH—; R'' is halogen, $NO_2$, $CH_3$, $C_2H_5$, $CF_3$, $CH_3S$, $C_2H_5S$ or, when R and R' collectively are —CH = CH—CH = CH—, H; $m$ is 0–2; and Alk is alkylene, have antiphlogistic, analgesic, antipyretic and other valuable pharmacological activities.

16 Claims, No Drawings 3,669,972

P-AMINOARYLALKANAL DERIVATIVES

This is a continuation-in-part of our prior filed applications Ser. No. 746,326, filed July 22, 1968 and Ser. No. 845,076, filed July 25, 1969.

BACKGROUND OF THE INVENTION

This invention relates to novel p-aminoarylalkanals and aldehydic functional derivatives thereof and to processes for their production.

SUMMARY OF THE INVENTION

According to this invention, p-aminoarylakanal compounds of the formula

 (1)

wherein Z represents

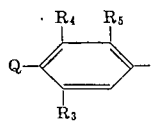

in which $R_1$ is a free or functionally modified aldehyde group; $R_2$ is H, $CH_3$ or $C_2H_5$; $R_3$ is F, Hal, $NO_2$, $CH_3$, $C_2H_5$, $CF_3$, $CH_3S$, $C_2H_5S$, or, when $R_4$ and $R_5$ collectively are —CH = CH—CH= CH—, also H; $R_4$ and $R_5$ each are H or, collectively, —CH = CH—CH = CH—; Q is a heterocyclic tertiary amino group, namely, pyrrolidino, piperidino or homopiperidino; and Hal is Cl, Br or I; and the acid addition salts thereof; which compounds possess, with good compatibility, excellent antiphlogistic activity, accompanied by good analgesic and antipyretic activities, and additionally, bacteriostatic, bactericidal, antiprotozoal, diuretic, blood-sugar-lowering, chloretic, chloesterol-level-lowering, and radiation-protective activities are produced by any of the following processes:

a. a compound otherwise corresponding to formula 1, but containing additionally to or in place of $R_1$ and/or H-atoms, at least one reducible group and/or C—C and/or C—N multiple bond, is treated with a reducing agent;

b. a compound of the formula Z—CH = $R_6$ (2) wherein $R_6$ is =$CH_2$, =CH—$CH_3$ or ($R_2$, Hal), is treated with CO and $H_2$ in the presence of a heavy metal catalyst;

c. a compound otherwise corresponding to formula 1 containing, in place of the group $R_1$, a substituent which can be oxidized to $R_1$, is treated with a dehydrogenating or oxidizing agent;

d. a carboxylic acid of the formula Z—E—COOH (3) wherein E is

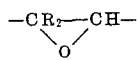

or —$CHR_2$—CO—, is treated with a decarboxylating agent;

e. an epoxide of the formula

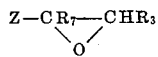 (4)

wherein one of $R_7$ and $R_8$ is $R_2$ and the other is H, is split so as to open the epoxy group;

f. a compound of the formula

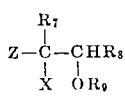 (5)

wherein X is Hal, —OH, or, optionally, an esterified or etherified OH-group, and $R_9$ is H, A or Ac, is treated with an agent which splits off HX;

g. a compound of the formula

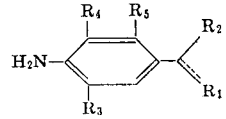 (6)

is reacted with a compound of the formula X—$(CH_2)_n$—X (7) wherein n is 4, 5 or 6;

h. a compound of the formula Z—$CHR_2$—M (8) wherein M is a chemical equivalent of a metallic atom or an organometallic residue, is reacted with a formic acid derivative of the formula HC ≡ $R_{10}$ (9) wherein $R_{10}$ is $(OA)_3$, (= O,OA), ( = NAr,OA), ( = O,NAAr) or ( = O,NAr$_2$);

i. a compound of the formula Z—CO—$R_2$ (10) is reacted with a compound of the formula $Ar_3P$ = CH-$OR_{11}$ (11) wherein $R_{11}$ is A or Ar; and/or, optionally, in a compound of formula 1, a functionally modified aldehyde group is liberated by treatment with a solvolyzing agent to produce a free aldehyde group; and/or a free aldehyde group is functionally modified by treatment with an acetalizing or acylating agent or with an acidic salt of sulfurous acid; and/or a compound of Formula 1 is converted into a physiologically compatible acid addition salt thereof by treatment with an acid; and/or a racemate of formula 1 is separated into its optical antipodes; and/or a free-base compound of formula 1 is liberated from the acid addition salts thereof by treatment with a base.

DETAILED DISCUSSION OF THE INVENTION

The p-aminoarylalkanals of this invention having a free aldehydic group can also be represented by the formula

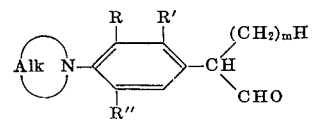

wherein $R = R_3$, $R' = R_4$, $R'' = R_5$, m is 0–2 and Alk is alkylene containing four to six carbon atoms in the chain, viz., pyrrolidino, piperidino and homopiperidine.

In Formula 1, $R_1$ can be monovalent or divalent, i.e., $R_1$ can be connected to the carbon atom bearing the three residues Z and $R_2$ by a single bond or by a double bond. In the former case, the compounds of Formula 1 have the formula Z—$CHR_2$—$R_1$ and in the latter case, the formula Z—$CR_2$ $R_1$. More particularly, this invention relates to the free aldehydes of the formula Z—$CHR_2$—CHO (1a) wherein Z and $R_2$ have the values given above, and to those derivatives thereof in which the aldehyde group has been functionally modified into a group which, under physiological conditions (for example, in the stomach or in the blood) can be removed to give the free aldehyde (1a). Among such aldehydic-modified derivatives of compounds of formula 1a are compounds of the formula Z—$CHR_2$—$Y_1$ (1b) wherein Z and $R_2$ have the values given above and $Y_1$ is —CHOH— $SO_3M_1$, —CHOH—OA, —CH$(OA)_2$, —CH$(OAc)_2$, —CHOA—SA, —CH$(SA)_2$ or —CH NOH in which a is alkyl of one to eight, preferably one to four carbon atoms or, when there are two A groups in the formula, they collectively can be an alkylene group of two to four carbon atoms, Ac is acyl of one to eight carbon atoms, preferably the residue of a fatty acid of two to four carbon atoms, and $M_1$ is a chemical equivalent of an alkali or alkaline earth metal, preferably Na; and compounds of the formula Z—$CR_2$ = $Y_2$ (1c) wherein $Y_2$ is = CHOA, = CHOAc or = CHOAr, in which Ar is unsubstituted or substituted aryl containing a total of six to ten carbon atoms, and Z, $R_2$, A and Ac have the values given above, and the acid addition salts of these compounds.

The compounds of formula 1b comprise, accordingly, the corresponding alkali metal or alkaline earth metal bisulfite, preferably sodium bisulfite, addition compounds of the formula $Z-CHR_2-CHOH-SO_3M_1$, hemiacetals of the formula $Z-CHR_2-CHOH-OA$, acetals of the formula $Z-CHR_2-CH(OA)_2$, acylates of the formula $Z-CHR_2-CH(OAc)_2$, homimercaptals of the formula $Z-CHR_2-CHOA-SA$, mercaptals of the formula $Z-CHR_2-CH(SA)_2$ and oximes of the formula $Z-CHR_2-CH = NOH$. The compounds of formula 1c comprise enol ethers of the formula $Z-CR_2 = CHOA$ and $Z-CR_2 = CHOAr$ and enol esters of the formula $Z-CR_2 = CHOAc$ of the free aldehydes of formula 1a.

These functional derivatives of formula 1b, among which the bisulfite addition compounds and the acetals are preferred, are normally more stable than the free aldehydes, which in most cases are very reactive. Thus, it is easier to process the functional derivatives into stable pharmaceutical preparations than the free aldehydes. It is believed that the activity of these functional derivatives is due to the fact that they are split in vivo to give the free aldehydes of 1a. Consequently, in compounds of Formula 1 wherein $R_1$ represents a functionally modified aldehyde group, the type of the functional modification is not critical, so long as the group can be split, e.g., hydrolytically or enzymatically, under physiological conditions to give the free aldehyde, e.g., 1a, and is physiologically acceptable. Such groups generally are these which can be hydrolyzed at pH values between 1 and 8.

Accordingly, the compounds of this invention are p-aminoarylalkanal derivatives of formula 1, and more particularly those of formulas 1a, 1b, and c, including the acid addition salts thereof. Of these, the following are preferred classes: Compounds of Formula 1 (or 1a, 1b, and 1c) wherein:

1. $R_1$ is $-CHO$, $-CHOH-SO_3Na$, $-CHOH-OA$, $-CH(OA)_2$, $-CH(OAc)_2$, $-CHOA-SA$, $-CH(SA)_2$ or $-CH = NOH$;
2. $R_1$ is $-CHO$, $-CHOH-SO_3Na$ or $-CHO(OA)_2$, preferably the former two;
3. $R_2$ is $CH_3$;
4. $R_3$ is F, Cl, Br, $CH_3$, $CH_3S$ or $C_2H_5S$, preferably F, Cl, Br or $CH_3$.
5. $R_4$ and $R_5$ each are H;
(6) $R_4$ and $R_5$ collectively are $-CH = CH-CH = CH-$, and $R_3$ is H;
7. Q is piperidino;
8. Compounds of group (2) wherein $R_3$ is F, Cl, Br, $CH_3$, $CH_3S$ or $C_2H_5S$, and $R_4$ and $R_5$ are H;
9. Compounds of group (2) where $R_3$ is H, and $R_4$ and $R_5$ together represent $-CH=CH-CH = CH-$;
10. Compounds of group (8) wherein $R_2$ is $CH_3$, $R_4$ and $R_5$ each are H, and Q is piperidino;
11. Compounds of group (9) wherein $R_2$ is $CH_3$ and Q is piperidino;
12. Compounds of group (8) wherein $R_1$ is $-CHO$ or $-CHOH-SO_3Na$;
13. Compounds of group (9) wherein $R_1$ is $-CHO$ or $-CHOH-SO_3Na$;
14. Compounds of group (10) wherein $R_1$ is $-CHO$ or $-CHOH-SO_3Na$ and $R_3$ is F, Cl, Br or $CH_3$.

In each of the above classes of compounds and these set forth below: Z is preferably 3-fluoro-4-piperidino-phenyl, 3-chloro-4-piperidinophenyl, 3-bromo-4-piperidino-phenyl, 3-methyl-4-piperidinophenyl or 4-piperidinonaphthyl-(1), and also can be 3-iodo-4-piperidinophenyl, 3-ethyl-4-piperidinophenyl, 3-trifluoromethyl-4-piperidinophenyl, 3-methyl-mercapto-4-piperidinophenyl, 3-ethylmercapto-4-piperidinophenyl, 3-fluoro-4-pyrrolidinophenyl, 3-chloro-4-pyrrolidinophenyl, 3-bromo-4-pyrrolidinophenyl, 3-fluoro-4-homopiperidinophenyl, 3-chloro-4-homopiperidinophenyl, 3-bromo-4-homopiperidinophenyl, 3-fluoro-4-piperidinonaphthyl-(1), 3-chloro-4-piperidinonaphthyl-(1), 3-bromo-4-piperidinonaphthyl-(1), and 3-methyl-4-piperidino-naphthyl-(1);

$R_1$ is preferably CHo, $Y_1$ or $Y_2$, but can also be an aldehyde group functionally modified as a Schiff base ($R_1 = -CH =$ NAr), as a hydrazone ($R_1 = -CH = N-NHY_3$, wherein $Y_3$ preferably represents H, Ar $CONH_2$, CONHAr, COOA, $CSNH_2$, or the residue of a Girard reagent) or as an azine ($R_1 = -CH = N-N = CH-CHR_2-Z$);

A is preferably methyl and ethyl and can also be other alkyl groups of one to eight carbon atoms, e.g., propyl, isopropyl, n-butyl, sec.-butyl, isobutyl, tert.-butyl, n-amyl, isoamyl, hexyl, isohexyl, heptyl, isoheptyl, octyl or isooctyl;

In the acetals, hemimercaptals and mercaptals of the free aldehydes of formula 1a, two A groups collectively preferably are $-CH_2CH_2-$ and can also be $-CH_2CH_2CH_2-$, $CH_2CH_2CH_2CH_2-$, and other alkylene groups containing a total of three to six carbon atoms and two to three carbon atoms in the chain, e.g., $-CH_2CH(CH_3)-$, $-CH(CH_3)CH(CH_3)$, or $-CH_2CH(C_2H_5)-$;

Ac preferably is acetyl, and can also be propionyl, butyryl or isobutyryl and other acyl groups containing one to eight carbon atoms, e.g., formyl, valeryl, isovaleryl, caproyl, trimethylacetyl, heptanoyl, octanoyl or benzoyl;

Ar is preferably phenyl and can also be phenyl substituted by one to three substituents on the ring, e.g., lower-alkyl, including methyl, ethyl, lower alkoxy, including methoxy, ethoxy, halo, e.g., F, Cl, or Br, such as, for example o-, m- or especially p-tolyl, o-, m- or p-ethylphenyl, o-, m- or p-methoxyphenyl, o-, m-or p-ethoxyphenyl, o-, m- or p-fluorophenyl, o-, m- or p-chlorophenyl, o-, m- or p-bromophenyl, or 1- or 2-naphthyl;

X is preferably Cl, Br, OH, OAc, OA, $-O-SO_2-A$ or $-O-SO_2-Ar$ and, in particular, in the compounds of formula 5 X is preferably OH, Cl, Br or OA, and the compounds of formula 7 X is preferably Cl, Br, I or $-O-SO_2Ar$ M is preferably MgHal or Li, and can also be other metallo groups, such as, for example, ZnHal, CdHal or Na, and $M_1$ is preferably Na, and can also be, for example, K or an equivalent of a Ca or Mg atom.

The process as described above is explained in greater detail below.

Inversion (a), a compound of formula 1 can be obtained by treating with a reducing agent a starting material containing, in addition to or in place of $R_1$ and/or hydrogen atoms, one or more reducible or hydrogen-replaceable groups and/or C = C and/or C = N double bonds and/or C = C and/or C = N triple bonds.

Groups which can be replaced by hydrogen atoms are, e.g., Hal; oxygen in an N-hydroxy, sulfinyl or carbonyl group; sulfur in a thiocarbonyl group; hydroxyl; mercapto; amino; and hydroxyl, mercapto or amino substituted by a hydrocarbon residue. Compounds containing only one of the above-mentioned groups or multiple bonds, and those containing, side-by-side, two or more of these groups or multiple bonds, can be converted into a compound of formula 1 in accordance with reducing methods described in the literature. Preferably, catalytically activated or nascent hydrogen, or complex metal hydrides are employed for this purpose.

Preferred starting substances for the reduction are, in particular, those which otherwise correspond to formula 1 but contain, in place of $R_1$, a residue of a higher oxidation stage, for example, a carboxyl or carboxylic acid ester residue, or a carboxylic acid halogenide, imino ether, amidino, carboxylic acid amide or nitrile group. Typically, such starting materials are those having the formula $Z-CH-R_{12}$ (12) wherein $R_{12}$ represents $-COOH$, $-COCl$, $-CN$, $-COOA$, $-CO-SA$, $-CON(A)_2$,

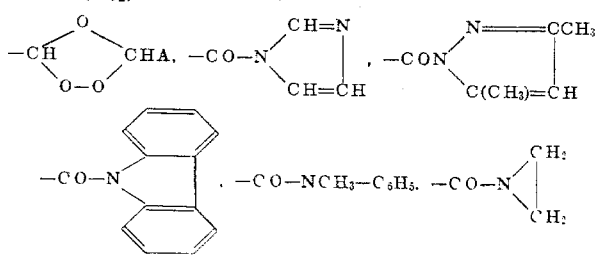

or $-CCl = N-C_6H_5$; in which Z, $R_2$ and A have the values given above.

Other preferred starting compounds for the reduction are olefine of the formula $Z-CR_{12n}-R_{12}$ wherein $R_{12a}$ is $=CH_2$, $=CH-CH_3$ or $(R_2, Hal)$ and $R_{12}$ has the values given above, but preferably represent $=CH_2$ and/or $-COOA$, respectively. The above-mentioned starting materials, particularly those of the formulas $Z-CHR_2-COOH$, $Z-CHR_2-COOA$, $Z-CHR_2-COCl$, $Z-CHR_2-CON(A)_2$ and $Z-CR_6-COOA$, and the preparation thereof, are described in our prior filed applications Ser. No. 746,326, filed July 22, 1968 and Ser. No. 845,076, filed July 25, 1969. They also can be prepared by conventional methods from the compounds described therein or analogously to the compounds described therein.

Thus, for example, 2-(3-chloro-4-piperidinophenyl)-propanal can be produced from α-(3-chloro-4-piperidinophenyl)-propionyl chloride by catalytic hydrogenation by the Rosenmund method, or by reaction with quinoline and NaCN by the Reissert method; from α-(3-chloro-4-piperidinophenyl)-propionitrile by reduction with $SnCl_2/HCl$ by the Stephen method; from α-(3-chloro-4-piperidinophenyl)-propionic acid ethyl ester by reduction with lithium-tri-tert.-butoxyaluminum hydride, from α-(3-chloro-4 piperidinophenyl)-acrylic acid ethyl ester or from N-[α-(3-chloro-4-piperidinophenyl)-propionyl]-imidazole or 3,5-dimethyl pyrazole or carbazole by reduction with $LiAlH_4$; or from α-(3-chloro-4-piperidinophenyl)-propionic acid phenylimide chloride by reaction with tetrachlorotin(II)-acid.

The reduction can be conducted with catalytically activated hydrogen to obtain 2-(3-methyl-4-piperidinophenyl)-ethanal-diethylacetal, employing as starting material 2-hydroxy-(when using $CuCr_2O_4$ catalyst); 2-chloro-, 2-bromo- or 2-iodo-(when using Pt catalyst); 2-mercapto-(when using Raney nickel catalyst); 2-amino-, 2-benzyloxy- or 2-benzylamino- (when using Pt catalyst); 2-oxo-(when using $PdCl_2$ catalyst); or 2-thio-2-(3-methyl-4-piperidinophenyl)-ethanal-diethylacetal (when using Raney nickel catalyst).

Substituted 2-methylene- or 2-ethylidenephenyl-alkanal-acetals, for example those of the formula $Z-CR_6-CH(OA)_2$ can be reduced to the corresponding saturated compounds of the formula $Z-CHR_2-CH(OA)_2$. Thus, 2-(3-chloro-4-piperidinophenyl)-propanal-diethyl-acetal is obtained from 2-(3-chloro-4-piperidinophenyl)-2-propenal-diethylacetal by hydrogenation on Pd-charcoal.

Furthermore, compounds containing a keto or lactam group in the heterocyclic ring can be reduced to the compounds of this invention. For example, by the reduction of 2-[3-methyl-4-(2-oxopiperidino)-phenyl]-propanal-diethylacetal or N-[2-(3-methyl-4-(2-oxopiperidino)-phenyl)-propionyl]-imidazole with $LiAlH_4$ there is obtained 2-(3-methyl-4-piperidinophenyl)-propanal-diethyl-acetal or the corresponding free aldehyde, respectively; by the reduction of 2-[3-methyl-4-(4-oxopiperidino)-phenyl]-propanal-ethyleneacetal with hydrazine in dimethyl sulfoxide, 2-(3-methyl-4-piperidinophenyl)-propanal-ethylene-acetal is produced.

Compounds otherwise corresponding to formula 1 in which the aldehyde group is suitably blocked, but carrying one or two hydroxy groups in the positions alpha to the N-atom of the hetero ring can be converted into compounds of formula 1 by reduction, the hydroxy group(s) being removed. These hydroxy compounds are produced as intermediates in the reductive alkylation of amines of the formula 6 with dialdehydes of the formula $OCH-(CH_2)_m-CHO$ ($m=2, 3$ or $4$) in the presence of hydrogen and hydrogenation catalysts. Normally, these intermediates are not isolated, the reductive reaction of succinic dialdehyde, glutaric dialdehyde or adipic dialdehyde with a compound of formula 6 being continued directly to the stage of the compounds of formula 1.

Basically, all conventional reduction processes described in the literature are suitable, depending on which one of the above-recited starting materials is selected.

Suitable catalysts for catalytic hydrogenations and/or hydrogenolyses are, for example, the noble metal, nickel and cobalt catalysts. For the reduction of carboxylic acid derivatives mixed catalysts, such as copper chromium oxide, are also suitable. The noble metal catalysts can be employed on supports (for example, platinum on charcoal, palladium on calcium carbonate or strontium carbonate), as oxide catalysts (e.g., platinum oxide), or as finely divided metallic catalysts. Nickel and cobalt catalysts are suitably employed as Raney metals. Nickel can also be used on kieselguhr or pumice as the support. The hydrogenation can be conducted at room temperature and normal pressure, and also at elevated temperature and/or elevated pressure. Preferably, the process is conducted at pressures of between 1 and 100 atmospheres and at temperatures of between $-80°$ and $200°$ C., particularly between room temperature and $+100°$ C. The reaction is suitably conducted in the presence of a solvent, such as water, methanol, ethanol, isopropanol, n-butanol, ethyl acetate, dioxane, acetic acid, or tetrahydrofuran. It is also possible to employ mixtures of these solvents. In the hydrogenation the free compounds or the corresponding salts, for example, the hydrochlorides, can be utilized. It is basically possible to operate under acidic, neutral, or basic conditions. For compounds containing a vinyl ether or acetal group or a $C=N$ double bond, reaction in a neutral or alkaline medium is preferred.

For the hydrogenation of acid chlorides of the formula $Z-CHR_2-COCl$, the Rosenmund method is preferred. This reaction is suitably conducted at normal pressure on $Pd/BaSO_4$ catalysts. Suitable solvents are aromatic hydrocarbons, e.g., benzene, toluene or xylene.

Another reduction method which can be used is the reaction with nascent hydrogen. The latter can be produced, for example, by treating metals with acids or bases. For example, a mixture of zinc with acetic acid advantageously can be used for the reduction of ozonides to aldehydes.

Zinc dust in an aqueous potassium hydroxide solution or Raney nickel in aqueous ethanol is suitable, for example, for the production of aldehydes from thiol esters. The reduction of nitriles with Raney nickel and formic acid, as well as of acid amides with sodium in ammonia likewise produces aldehydes of formula 1a.

Particularly useful reducing agents are the complex metal hydrides, in particular, $LiAlH_4$ and $NaAlH_4$, as well as the lithium diethoxy, lithium triethoxy aluminum hydride, and sodium triethoxy aluminum hydride, and the dialkyl aluminum hydrides, e.g., diisobutyl aluminum hydride. In this regard, the reaction is suitably conducted in the presence of an inert lithium alkoxy aluminum hydrides, e.g., lithium tri-tert.butoxy, solvent, e.g., ether, tetrahydrofuran and ethylene glycol dimethyl ether. The reductions, advantageously, are conducted between $-80°$ C. and the boiling point of the solvent. The thus-formed metal complexes can be decomposed in the usual manner, for example, with moist ether or an aqueous ammonium chloride solution.

Compounds of formula 1 can be obtained by the oxidation of compounds which otherwise correspond to Formula 1 but which contain instead of $R_1$, an organic residue which can be oxidized into an aldehyde group. Suitable starting compounds are, for example, those of the formula $Z-CHR_2-R_{13}$ (13) wherein $R_{13}$ represents $-CH_2OH$, $-CH=CHR_{14}$, $-CHOH-CHOH-R_{14}$, $-CHOH-CO-R_{14}$, $-CHOH-COOR_{14}$ or $-CHOH-CHNH_2-R_{14}$, in which $R_{14}$ is H or any desired organic residue, preferably A, Ar, or CN, the exact nature of $R_{14}$ being not critical since that portion of the molecule of formula 13 carrying the residue $R_{14}$ is removed by oxidation. Useful for the production of aldehydes of formula 1 by the oxidation of alcohols of the formula $Z-CHR_2-CH_2OH$, the production of which is described in application Ser. No. 845,076, filed July 25, 1969. This oxidation of alcohols to aldehydes of formula 1a can also be conducted in accordance with a great number of methods described in the literature.

For example, the alcohols can be dehydrogenated catalytically with hydrogen being split off, or with the aid of oxidizing agents The catalytic dehydrogenation is best conducted under reduced pressure in the vapor phase. Copper, silver, and zinc compounds are predominantly employed as the catalysts. The reaction temperature is normally maintained between 100° and 450° C. However, it is also possible to conduct the dehydrogenation in the presence of hydrogen acceptors. Such acceptors are, especially, nitrated aromatic hydrocarbons, e.g., nitrobenzene or m-dinitrobenzene, used with powdered copper catalyst. The reaction is conducted by heating the reactants in an inert solvent, for example xylene, with air being passed through the reaction mixture.

The oxidation can be conducted, for example, with chromic acid. The process is conducted in an aqueous solution or another inert solvent at a temperature between 0° and 100° C. Chromic acid - pyridine complex can also be used as an oxidation agent. Nitrogen or carbon dioxide can be introduced into the reaction mixture to suppress the continued oxidation of the thus-formed aldehyde to an acid. A modification of the $CrO_3$ oxidation is the dehydrogenation with tert.-butyl chromate, which reaction is conducted in excess tertiary butanol or in an inert diluent, e.g., petroleum ether, benzene or $CCl_4$.

A preferred oxidizing method is the conversion of alcohols of the formula $Z-CHR_2-CH_2OH$ into the corresponding aldehydes $1a$ with dimethyl sulfoxide. The reaction is conducted in the presence of an agent which splits out water, e.g., acetic anhydride or, under milder conditions, in the presence of dicyclohexyl carbodiimide with the addition of a suitable acid, e.g., trifluoroacetic acid or $H_3PO_4$, at room temperature for ½ to 24 hours.

Compounds of the formula $Z-CHR_2-CH = CH-R_{14}$, for example, wherein $R_{14}$ is $-CN$, which compounds can be obtained by reacting a carbonyl compound $Z-CO-R_2$ with acrylonitrile in the presence of triphenylphosphine in cyclohexanol, can likewise be converted into aldehydes $1a$ by oxidation. Oxidation with $KMnO_4$ or $OsO_4$ produces 1,2-glycols of the formula $Z-CHR_2-CHOH-CHOH-R_{14}$ which can be split into aldehydes $1a$, for example with $H_5IO_6$. Oxidizing the olefinic double bond with ozone produces ozonides which can be reductively cleaved into aldehydes $1a$ with zinc in glacial acetic acid or by catalytic hydrogenation with palladium/calcium carbonate catalyst.

Compounds of formula 13 wherein $R_{13}$ is a group bearing functional groups on the first two adjacent carbon atoms, for example, 1,2-diols, 1,2-ketols, α-hydroxy acids or 1,2-hydroxy amines, can be cleaved with lead tetraacetate, $NaBiO_3$, or $H_5IO_6$ between the carbon atoms carrying the functional groups, with the formation of an aldehyde function. The lead tetraacetate oxidation is conducted with a stoichiometric amount of oxidizing agent in an inert solvent, e.g., glacial acetic acid, chloroform, tetrachloroethane, benzene or nitrobenzene at temperatures of 0°-60° C. When conducting the oxidation with periodic acid, the reaction is carried out in an aqueous medium. Suitable solubilizers for such glycols are emulsifiers, dioxane, glacial acetic acid or tert.-butanol. The reaction temperature is maintained between 0° and 15° C.

Finally, it is also possible to produce aldehydes of formula 1 wherein $R_2 = H$ by oxidizing, with hydrogen peroxide in accordance with conventional methods, an ethylene boron compound of the formula $Z-CH = CH-B(R_{14})_2$, which can be obtained by the hydroboration of an aryl acetylene of the formula $Z-C \equiv CH$ with a wettable mono- or di-substituted boron hydride, preferably in an ethereal solvent, e.g., tetrahydrofuran.

Enol ethers of the general Formula 1c wherein $Y_2$ is $= CHOA$ can be produced from compounds of the formula $Z-CR_2(OH)-CH_2OA$ by slitting off water. The dehydration is conducted, for example, with $P_2O_5$ in pyridine, p-toluenesulfonic acid, polyphosphoric acid, molecular sieves, dehydrating oxides, or by azeotropic dehydration.

The aldehyde group in a compound of formula 1 wherein the aldehyde group is present in a functionally modified form, preferably a compound of formula $1b$ or $1c$, can be liberated by treatment with solvolyzing agents. Thus, the free aldehydes $1a$ can be obtained from the corresponding hemiacetals or acetals by hydrolysis. The hemiacetals, e.g., those of the formula $Z-CHR_2-CHOH-OA$, and acetals, e.g., those of the formula $Z-CHR_2-CH(OA)_2$, are usually hydrolyzed very readily with water in the presence of acids, usually, dilute or concentrated mineral acids, e.g., sulfuric acid, hydrochloric acid or phosphoric acid, or organic acids, e.g., oxalic acid, tartaric acid or citric acid. The reaction can be conducted at temperatures of between about −20° and −100° C., preferably between +20° and +80° C., with or without an additional solvent. The acetals can first be dissolved by the addition of a water miscible solvent, e.g., acetone, ethanol, tetrahydrofuran or acetic acid. The acetals can also be reacted with acids in the presence of anhydrides. Suitable acid anhydrides, which are preferably employed in an equivalent molar ratio, are, for example, acetic anhydride, benzoic acid anhydride, and phthalic acid anhydride. Alternatively, an acid halide, e.g., acetyl bromide, can be employed. The hydrolysis of the acetals in an aqueous $NaHSO_3$ solution results in the production of bisulfite addition compounds of the aldehydes $1a$, i.e., compounds of the formula $Z-CHR_2-CHOH-SO_3Na$.

Aldehydes of formula $1a$ can also be produced by splitting hemithioacetals, e.g., those of the formula $Z-CHR_2-CHOA-SA$, or thioacetals, e.g., mercaptals of the formula $Z-CHR_2-CH(SA)_2$. The splitting of the hemithioacetals is accomplished with Raney nickel and the splitting of the mercaptals is effected with $HgCl_2$ in acetone, tetrahydrofuran or dioxane. It is also possible to employ mixtures of $HgCl_2$ and $CdCO_3$ or of $HgCl_2$ and HgO for the splitting operation.

Schiff bases, e.g., those of the formula $Z-CHR_2-CH = NAr$, can be split by a brief heating with dilute acids, e.g., the above-mentioned mineral acids or oxalic acid, optionally with the addition of solvents, such as ethanol or acetic acid. The Schiff bases can also be split with $NaHSO_3$, the thus-formed amine $ArNH_2$ being removed by distillation or extraction, and the aldehyde $1a$ being isolated in the form of its bisulfite addition compound or after being liberated from this addition compound as described below. Aldehydes of formula $1a$ can also be liberated by hydrolyzing the condensation products thereof with compounds of the acid amide type, e.g., carboxylic acid amides, sulfonic acid amides, urethanes, urea derivatives, by treatment with acids.

Aldehydes of the formula $1a$ also can be obtained by the hydrolysis of hydrazones of the formula $Z-CHR_2-CH = N-NY_3$ or of azines of the formula $(Z-CHR_2-CH = N-)_2$. The hydrolysis of these derivatives is preferably conducted by acid hydrolysis, e.g., using a dilute solution of oxalic acid or phthalic acid. Sulfurous acid with heating can be used to split oximes. Also suitable are aqueous mineral acids. The compounds to be split are dissolved by the addition of ethanol, tetrahydrofuran, acetic acid or dioxane. Hydrazones also can be cleaved by treatment with another carbonyl compound, e.g., p-nitrobenzaldehyde, 2,4-dinitrobenzaldehyde or pyruvic acid. In the thus-produced equilibrium mixture, the aldehyde $1a$ is liberated and the corresponding derivative of the added carbonyl compound is formed, which derivative is normally less soluble. The hydrazone and the carbonyl compound can be heated under reflux as an aqueous suspension or in an alcoholic-aqueous solution. Girard's "T" or "P" derivatives of the aldehydes of Formula $1a$ can be liberated by splitting with hydrochloric acid or sulfuric acid at temperatures of 0° C. up to the boiling temperature of the solvent employed, e.g., water, optionally in mixture with methanol or ethanol. The thus-formed aldehyde is extracted from the aqueous phase with a suitable organic solvent, e.g., $CHCl_3$. Oximes of the formula $Z-CHR_2-CH = NOH$ can also be split oxidatively by treatment with nitrous acid or amyl nitrite or $FeCl_3$ in the presence of an acid.

Bisulfite addition compounds of the formula $Z-CHR_2-CHOH-SO_3M_1$ can be split into aldehydes of Formula $1a$ by treatment with bases or acids, e.g., by heating in an aqueous solution. Advantageously, the heating is conducted with dilute aqueous acids, e.g., HCl or $H_2SO_4$, with bicarbonates, e.g., $NaHCO_3$, with carbonates, e.g., $Na_2CO_3$, or with alkalis, e.g., NaOH. The splitting reaction also can be initiated by the addition of another carbonyl compound which exhibits a greater affinity to bisulfite, e.g., formaldehyde.

Aldehydes of formula 1a also can be obtained by splitting enol ethers of the formula $Z-CR_2 = CHOA$ or $Z-CR_2 = CHOAr$. The enol ethers can be split, for example, with dilute mineral acids, such as HCl or $H_2SO_4$. The splitting step can also be conducted with acetic acid or $NaHCO_3$. With very sensitive enol ethers, the heating can be conducted in water to 100° C. under elevated pressure. The splitting step can also be conducted with hydroxylamine hydrochloride or semicarbazide hydrochloride. In this process, the aldehydes are isolated in the form of their oximes or semicarbazones.

Free aldehydes of formula 1a can optionally be converted, into hemiacetals, e.g., those of the formula $Z-CHR_2-CHOH-OA$, or acetals, e.g., those of the formula $Z-CHR_2-CH(OA)_2$, by treatment with acetalizing agents, e.g., alcohols. For example, the aldehyde can be reacted with an alcohol of the formula $A-OH$, e.g., methanol, ethanol, n-propanol, isopropanol, n-butanol, isobutanol; with a glycol of the formula $HO-C_mN_{2m}-OH$ ($m=2, 3,$ or 4), e.g., ethylene glycol, 1,2-propanediol, 1,3-propanediol, 1,2-butanediol, 2,3-butanediol, 1,4-butanediol; or with a phenol of the formula $Ar-OH$, in the presence of a catalyst. The condensation of the aldehydes 1a with polyhydric alcohols or phenols result in the cyclic acetals. For example, with 1,2-glycols, derivatives of 1,3-dioxolane are obtained, and with 1,3-glycols, derivatives of 1,3-dioxane. Suitable catalysts are acids, e.g., mineral acids, such as $HClH_2SO_4$, $H_3PO_4$; sulfonic acids, such as p-toluenesulfonic acid; $NaHCO_3$; $P_2O_5$; $CaCl_2$; $FeCl_3$; $ZnCl_2$; iodine; anhydrous $CuSO_4$; and cation exchangers. The water of reaction can be removed by azeotropic distillation with the use of an azeotropic agent, e.g., benzene, toluene, petroleum ether. Dimethyl or diethyl acetals can be produced by introducing gaseous hydrogen chloride (up to about 1 percent) into the methanolic or ethanolic solution of the aldehyde.

Acetals of the formula $Z-CHR_2-CH(OA)_2$ can also be produced by reacting aldehydes of formula 1a with orthoformic acid esters of the formula $HC(CA)_3$ in the presence of acidic catalysts and, usually, the corresponding alcohol of the formula $A-OH$. Suitable catalysts are small amounts of mineral acids, aromatic sulfonic acids, $FeCl_3$, $NH_4Cl$, $NH_4NO_3$, $KHSO_4$, and the hydrochlorides of bases, e.g., pyridine hydrochloride. The reaction mixture is most advantageously heated for a short period of time and then allowed to stand at room temperature. It is also possible to employ formimido ester salts, for example formimido ester hydrochlorides, in place of the orthoformic acid esters. The reaction of the aldehydes 1a with orthosilicic acid esters of the formula $Si(OA)_4$ in an alcoholic solution in the presence of acids or acid-reacting substances likewise results in the desired acetals. A combination of an alcohol of the formula $A-OH$ with dimethyl sulfite in the presence of an acidic catalyst can also be used for the acetylization. During the reaction, $SO_2$ is liberated, so that the progress of the reaction can be controlled by observing the evolvement of gas.

A further method for the preparation of acetals is by acetal interchange of a lower acetal (dimethyl or diethyl acetal) in the presence of an acidic catalyst and a higher boiling alcohol, e.g., a glycol of the formula $HO-C_mH_2mOH$. The resulting equilibrium can be shifted in favor of the acetal of the higher-boiling alcohol by removing the lower alcohol, e.g., heating the lower acetal at the boil with an excess of the higher boiling alcohol, in the presence of an acidic catalyst, for example HCl $H_2SO_4$, p-toluenesulfonic acid, $FeCl_3$ or $BF_3$. Dihydric and polyhydric alcohols react particularly smoothly with lower acetals, and this method is especially well suited for their preparation. It is possible to combine the preparation of the acetal with orthoformic acid esters and the acetal interchange to one operation. Under the conditions of the acetal interchange, an exchange of the free carbonyl compounds can likewise occur. Thus, it is possible, for example, to convert an aldehyde of formula 1a, with acetone dimethyl ketal or butanone ethylene ketal, in the presence of p-toluenesulfonic acid, into the corresponding dimethyl or ethylene acetal, respectively. The thus-liberated acetone or butanone is removed from the equilibrium mixture.

Hemithioacetals, e.g., of the formula $Z-CHR_2-CHOA-SA$, and thioacetals, e.g., of the formula $Z-CHR_2-CH(SA)_2$, are obtained by reacting the aldehydes 1a with mercaptoalkanols, e.g., of the formula $HS-C_mH_{2m}-OH$, preferably 2-mercaptoethanol, with mercaptans, e.g., of the formula $A-SH$, preferably methyl or ethyl mercaptan but also n-propyl, isopropyl, n-butyl, isobutyl, n-amyl, n-hexyl, n-heptyl or n-octyl mercaptan, or with dithiols, e.g., of the formula $HS-C_mH_{2m}-SH$, preferably 1,2-ethanedithiol but also 1,2-propanedithiol, 1,3-propanedithiol, 1,2-butanedithiol, 2,3-butanedithiol or 1,4-butanedithiol. In this application, mercaptoalkanols, mercaptans and dithiols are included in the term "acetalizing agents." The condensation of the aldehydes with these compounds takes place rapidly at room temperature. A suitable temperature range for the reaction is between −70° and +200° C. The reaction, particularly with low-boiling mercaptans, can be conducted in the presence of an inert solvent, e.g., hydrocarbon, such as benzene, toluene or xylene. A preferred catalyst is boron trifluoride etherate, with or without the addition of acetic acid.

Aldehydes of formula 1a can be converted into the corresponding acylates, e.g., of the formula $Z-CHR_2-CH=(OAc)_2$, by treatment with acylating agents, e.g., acid anhydrides. Thus, for example, 2-(3-methyl-4-piperidinophenyl)-propanal can be converted into 2-(3-methyl-4-piperidinophenyl)-propanal diacetate by treatment with acetic anhydride in the presence of sodium acetate. At an elevated temperature and in the presence of an acidic catalyst, 1 mol of acid (HOAc) can be eliminated with the formation of the corresponding enol acylates, e.g., of the formula $Z-CR_2=CH-OAc$.

The free aldehydes of formula 1a also can be converted by treatment with metal bisulfite solutions into stable, often crystalline, addition compounds of the formula $Z-CHR_2-CHOH-SO_3M_1$. In general, the reaction is conducted by dissolving the aldehyde in ether and treating it with concentrated aqueous $NaHSO_3$. It is sometimes useful to add an alcohol, e.g., methanol or ethanol, as the additional solvent, or to introduce this alcohol toward the end of the reaction for purpose of quantitative precipitation. The bisulfite solution can be freshly prepared by combining 1 mol of $Na_2SO_3$ and 1 mol of acetic acid. Another method involves combining the aldehyde and an aqueous $Na_2SO_3$ solution, introducing $SO_2$, and continuously neutralizing the thus-liberated sodium hydroxide. Also, $SO_2$ added to an aqueous solution or suspension of the aldehyde, with a continuous addition of NaOH, also results in the bisulfite compounds. The bisulfite compounds, in most cases, exhibit poor solubility in excess $NaHSO_3$ solution. Therefore, they can be readily separated and can normally be purified by recrystallization from aqueous ethanol.

A compound of formula 1 in free base form can be converted into an acid addition salt thereof with acid in the conventional manner. For this reaction, preferred are acids which yield physiologically acceptable salts. Other acids can be used for purification, isolation or identification purposes. Organic and inorganic acids which can be used include aliphatic, alicyclic, araliphatic, aromatic and heterocyclic mono- or polybasic carboxylic and sulfonic acids, e.g., formic acid, acetic acid, propionic acid, pivalic acid, diethylacetic acid, oxalic acid, malonic acid, succinic acid, pimelic acid, fumaric acid, maleic acid, lactic acid, tartaric acid, malic acid, aminocarboxylic acids, sulfamic acid, benzoic acid, salicylic acid, phenylpropionic acid, citric acid, gluconic acid, ascorbic acid, nicotinic acid, isonicotinic acid, methane- or ethanesulfonic acid, ethanedisulfonic acid, β-hydroxyethane-sulfonic acid, p-toluenesulfonic acid, naphthalene-mono- and disulfonic acids, sulfuric acid, nitric acid, hydrohalic acids, such as hydrochloric acid or hydrobromic acid, or phosphoric acids, such as orthophosphoric acid. Conversely, compounds of formula 1 in free base form can be liberated from the acid addition salts thereof by treatment with a strong base, e.g., an aqueous solution of sodium or potassium hydroxide, sodium or potassium carbonate.

When the compounds of formula 1 contain a center of asymmetry, they are usually formed in the racemic form. Such racemates can be separated into the optical antipodes thereof in accordance with a plurality of known methods described in the literature. Thus, it is possible to precipitate some racemic mixtures in the form of eutectics instead of in the form of mixed crystals and rapidly separate them in the manner. In these cases, a selective precipitation is also possible. However, chemical separation is preferred. According to this method, diastereomers are formed from the racemic mixture by reaction with an optically active separating agent, e.g., by forming a salt of the mixture of diastereomers of an aminophenylalkanal of formula 1 with optically active acids, such as, for example, D- and L-tartaric acid, dibenzoyl-D- and L-tartaric acid, diacetyl-D- and L-tartaric acid, β-camphor-sulfonic acid, D- and L-mandelic acid, D- and L- malic acid or D- and L-lactic acid. Also, the aldehydes can be converted by reaction with optically active aldehyde reagents, e.g., 1-menthylhydrazine, tartramic acid hydrazide, or 2,3-butanediol, into diastereomeric mixtures of the corresponding derivatives, for example, the corresponding hydrazones or acetals. The difference in the solubility of the thus-obtained diastereomers permits the selective crystallization of one form and the regeneration of the respective optically active substituted aminoarylalkanals from the mixture. It is likewise possible to employ chromatographic methods, e.g., gas-chromatography, for the separation of the diastereomers. The optical antipodes can also be separated biochemically with the use of selective enzymatic reactions. Thus, the racemic aminoarylalkanals can be exposed to an asymmetric oxidase which destroys one form by oxidation, whereas the other form remains unchanged. Hydrolase can be used to hydrolize a derivative in racemic mixture form to preferentially form one isomer only of the free aldehyde. Thus, a functional derivative form of an aminoarylalkanals of formula 1 can be subjected to the effect of a hydrolase which selectively saponifies one enanthiomorph and leaves the other one unchanged. It is, of course, also possible to obtain optically active compounds in accordance with the methods described above by employing optically active starting materials.

The compounds of formula 1 and/or optionally the physiologically acceptable acid addition salts thereof can be employed in a mixture with conventional pharmaceutical excipients in the human or veterinary medicine. Carrier substances can be those organic or inorganic materials which are suitable for parenteral, enteral or topical application and do not react with the novel compounds, such as, for example, water, vegetable oils, polyethylene glycols, gelatin, lactose, amylose, magnesium stearate, talc, vaseline or cholesterol. For parenteral application, particularly suitable are solutions, preferably oily or aqueous solutions, as well as suspensions or emulsions. For enteral application, suitable are furthermore tablets or dragees, and for topical application, salves or creams which are optionally sterilized or mixed with auxiliary substances, such as preservatives, stabilizers or wetting agents, or salts for influencing the osmotic pressure, or with buffer substances.

The compounds of this invention are preferably administered in dosages of 1–2,000 mg. per dosage unit.

In the examples set forth below, the temperatures are indicated in degrees centigrade. "Usual work-up operation" means water is added to the reaction mixture. The latter is adjusted to the pH set forth, optionally by the addition of hydrochloric acid or sodium hydroxide; the reaction mixture is extracted with ethyl acetate, chloroform or ether, dried over sodium sulfate, filtered, the solvent is distilled off, and the residue is distilled or crystallized from the solvent employed. DMSO means dimethyl sulfoxide; diglyme means diethylene glycol dimethyl ether; THF means tetrahydrofuran. The sodium bisulfite addition compounds ("bisulfite compound") set forth herein melt with decomposition.

As stated above, the compounds of this invention have excellent anti-inflammatory activity. For example, the sodium bisulfite addition product of 2-(3-chloro-4-piperidinophenyl)-propanal [2-(3-chloro-4-piperidinophenyl)-1-propanol-1-sulfonic sulfonic acid sodium salt; (A)]in the UV erythema test on guinea pigs, exhibits approximately 300 times the anti-inflammatory effect and 2-(3-bromo-4-piperidinophenyl)-propanal [2-(3-bromo-4-piperidinophlenyl)-1-propanol-1-sulfonic acid sodium salt; (B)] exhibits about 100 times the anti-inflammatory effect of the antiphlogistic agent "Ibufenac" (p-isobutyl-phenylacetic acid) with approximately the same acute toxicity (in mice).

Compared with other antiphlogistics, the compounds of this invention exhibit marked advantages. For example, compared with phenylbutazone (1,2-diphenyl-4-n-butyl-3,5-pyrazolidinedione), which has approximately the same toxicity as the compounds of this invention, the following effect relationships were determined in conventional tests:

| Compound | Analgesic test | Writhing (mouse) | Kaolin Edema test (rat) |
|---|---|---|---|
| Phenylbutazone (Comparison Compound) | 1 | | 1 |
| A | | 13 | 10 |
| B | | 3 | |
| 2-(3-Chloro-4-piperidinophenyl)-propanal-ethyleneacetal | | 4 | |
| 2-(3-Methyl-4-piperidinophenyl)-propanal | | 4 | |
| Sodium salt of 2-(3-methyl-4-piperidinophenyl)-1-propanol-1-sulfonic acid | | 2 | |

Compared with the conventional anti-inflammatory agent indomethacin, (1-p-chlorobenzoyl-2-methyl-5-methoxy-indolyl-3-acetic acid), the compounds of this invention have about the same order of activity but generally substantially lower toxicity. For example, Compound A is three times as effective and Compound B equally as effective in the UV erythema of guinea pigs test as indomethacin, but exhibit only about one-twentieth the acute toxicity thereof (on mice).

The compounds of formula 1 can also be employed as intermediates for the preparation of other biologically effective substances. For example, they can be converted by oxidation into the corresponding carboxylic acids of the formula Z—$CHR_2$—COOH, and by reduction into the corresponding alcohols of the formula Z—$CHR_2$—$CH_2$OH which, in turn, are valuable drugs, i.e., the alcohols exhibit highly active antiphlogistic effects accompanied by analgesic and anti-pyretic effects as disclosed in our prior-filed application Ser. No. 845,076, filed July 25, 1969.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

EXAMPLE 1

16.4 g. of 2-(3-chloro-4-piperidinophenyl)-propionyl chloride (b.p. 156°–160°/0.1 mm.; obtained by boiling the acid for 1.5 hours with $SOCl_2$ in benzene) is hydrogenated using 6 g. 2 percent Pd-$BaSO_4$ catalyst in 350 ml. of toluene until the stoichiometric amount of hydrogen has been absorbed. The reaction mixture is evaporated under reduced pressure and, the thus-obtained crude 2-(3-chloro-4-piperidinophenyl)-propanal is mixed with a $NaHSO_3$ solution, shaken for 5 hours, vacuum-filtered, and then washed with water, ethanol and ether. The bisulfite compound of 2-(3-chloro-4-piperidinophenyl)-propanal is obtained, m.p. 185°–190° (from ethanol/water).

Analogously, from:

3-fluoro-4-piperidinophenylacetyl chloride; 3-chloro-4-piperidinophenylacetyl chloride; 3-bromo-4-piperidinophenylacetyl chloride; 3-methyl-4-piperidinophenylacetyl chloride; 3-trifluoromethyl-4-piperidinophenylacetyl chloride; 2-(3-fluoro-4-piperidinophenyl)-propionyl chloride; 2-(3-bromo-4- piperidino-phenyl)-propionyl chloride; 2-(3-iodo-4-piperidinophenyl)-propionyl chloride; 2-(3-methyl-4-piperidinophenyl)-propionyl chloride; 2-(3-ethyl-4-piperidinophenyl)-propionyl chloride; 2-(3-trifluoromethyl-4-piperidinophenyl)-propionyl chloride; 2-(3-methylmercapto-4-piperidinophenyl)-propionyl chloride; 2-(3-ethylmercapto-4-piperidinophenyl)-propionyl chloride; (+)-3-(3-chloro-4-piperidinophenyl)-propionyl chloride; (−)-2-(3-chloro-4-piperidinophenyl)-propionyl chloride; (+)-2-(3-bromo-4-piperidinophenyl)-propionyl chloride; (−)-2-(3-bromo-4-piperidinophenyl)-propionyl chloride; (+)-2-(3-methyl-4-piperidinophenyl)-propionyl chloride; (−)-2-(3-methyl-4-piperidinophenyl)-propionyl chloride; (+)-2-(3-ethylmercapto-4-piperidinaphenyl)-propionyl chloride; (−)-2-(3-ethylmercapto-4-piperidinophenyl)-propionyl chloride; 2-(3-fluoro-4-pyrrolidinophenyl)-propionyl chloride; 2-(3-chloro-4-pyrrolidinophenyl)-propionyl chloride; 2-(3-bromo-4-pyrrolidinophenyl)-propionyl chloride; 2-(3-methyl-4-pyrrolidinophenyl)-propionyl chloride; 2-(3-methylmercapto-4-pyrrolidinophenyl)-propionyl chloride; 2-(3-ethylmercapto-4-pyrrolidinophenyl)-propionyl chloride; 2-(3-chloro-4-homopiperidinophenyl)-propionyl chloride; 2-(3-bromo-4-homopiperidinophenyl)-propionyl chloride; 2-(3-ethylmercapto-4-homopiperidinophenyl)-propionyl chloride; 2-(3-fluoro-4-piperidinophenyl)-butyryl chloride; 2-(3-chloro-4-piperidinophenyl)-butyryl chloride; 2-(3-bromo-4-piperidinophenyl)-butyryl chloride; 2-(3-methyl-4-piperidinophenyl)-butyryl chloride; 2-(3-ethylmercapto-4-piperidinophenyl)-butyryl chloride; 4-piperidinonaphthyl-1-acetyl chloride; 2-(4-piperidinonaphthyl-1)-propionyl chloride; 2-(4-pyrrolidinonaphthyl-1)- propionyl chloride 2-(4-homopiperidinonaphthyl-1)-propionyl chloride; 2-(3-chloro-4-piperidinonaphthyl-1)-propionyl chloride; 2-(3-methyl-4-piperidinonaphthyl-1)-propionyl chloride, (+)-2-(4-Piperidino-naphthyl-1)-propionyl chloride, (−)-2-(4-Piperidinonaphthyl-1)-propionyl chloride, 2-(4-Piperidinonaphthyl-1)-butyryl chloride. The aldehydes set forth below are obtained by a Rosenmund hydrogenation and, by subsequent reaction with NaHSO₃ solution, the bisulfite addition compounds thereof are produced: 3-fluoro-4-piperidinophenyl-acetaldehyde, b.p. 100°–106°/0.05 mm.; 3-chloro-4-piperidinophenyl-acetaldehyde, b.p. 124°–126°/0.01 mm.; ⅛-bromo-4-piperidinophenyl-acetaldehyde, b.p. 150°–152°/0.01 mm.; 3-methyl-4-piperidinophenyl-acetaldehyde, b.p. 100°–105°/0.1 mm.; 3-trifluoromethyl-4-piperidinophenyl-acetaldehyde, b.p. 115°–118°/0.03 mm.; 2-(3-fluoro-4-piperidinophenyl)-propanal, b.p. 115°–118°/0.03 mm., bisulfite compound, m.p. 190°–192°; 2-(3-bromo-4-piperidinophenyl)-propanal, b.p. 160°–165°/0.01 mm., bisulfite compound, m.p. 193°–195°; 2-(3-iodo-4-piperidinophenyl)-propanal, bisulfite compound, m.p. from 190°; 2-(3-methyl-4-piperidinophenyl)-propanal, b.p. 108°–110°/0.01 mm.; 2-( 3-ethyl-4-piperidinophenyl)-propanal, b.p. 130°–135°/0.01 mm.; 2-(3-trifluoromethyl-4-piperidinophenyl)-propanal, b.p. 120°–123°/0.05 mm.; 2-(3-methylmercapto-4-piperidinophenyl)-propanal, b.p. 150°–160°/0.01 mm.; 2-(3-ethylmercapto-4-piperidinophenyl)-propanal, b.p. 168°–175°/0.01 mm.; (+)-2-(3-chloro-4-piperidinophenyl)-propanal; (−)-2-(3-chloro-4-piperidinophenyl)-propanal; (+)-2-(3-bromo-4-piperidinophenyl)-propanal; (−)-2-(3-Bromo-4-piperidinophenyl)-propanal; (+)-2-(3-methyl-4-piperidinophenyl)-propanal; (−)-2-(3-Methyl-4-piperidinophenyl)-propanal; (+)-2-(3-ethylmercapto-4-piperidinophenyl)-propanal; (−)-2-(3-ethylmercapto-4-piperidinophenyl)-propanal; 2-(3-fluoro-4-pyrrolidinophenyl)-propanal, b.p. 100°–105°/0.02 mm.; 2-(3-chloro-4-pyrrolidinophenyl)-propanal, b.p. 120°–126°/0.01 mm.; 2-(3-bromo-4-pyrrolidinophenyl)-propanal, b.p. 150°–155°/0.01 mm.; 2-(3-methyl- 4-pyrrolidinophenyl)-propanal, b.p. 85°–92/0.01 mm.; 2-(3-methylmercapto-4-pyrrolidinophenyl)-propanal, b.p. 130°–135°/0.02 mm.; 2-(3-ethylmercapto-4-pyrrolidinophenyl)-propanal, b.p. 152°–156°/0.01 mm.; 2-(3-chloro-4-homopiperidinophenyl)-propanal, b.p. 150°–158°/0.05 mm.; 2-(3-bromo-4-homopiperidinophenyl)-propanal, b.p. 170°–175°/0.02 mm.; 2-(3-ethylmercapto-4-homopiperidinophenyl)-propanal, b.p. 185°–195°/0.01 mm.; 2-(3-fluoro-4-piperidinophenyl)-butanal, b.p. 140°10.01 mm.; 2-(3-chloro-4-piperidinophenyl-butanal, b.p. 125°–129°/0.03 mm.; 2-(3-bromo-4-piperidinophenyl)-butanal, b.p. 175°–185°/0.01 mm.; 2-(3-methyl-4-piperidinophenyl)butanal, b.p. 127°–133°/0.01 mm.; 2-(3-ethylmercapto-4-piperidinophenyl)-butanal, b.p. 185°–190°/0.02 mm.; 4-piperidinonaphthyl-1-acetaldehyde, b.p. 142°–147°/0.01 mm.; 2-(4-piperidinonaphthyl-1)-propanal, m.p. 32°, b.p. 160°–165°/0.05 mm.; 2-(4-pyrrolidinonaphthyl- 1)-propanal, b.p. 145°–150°/0.1 mm.; 2-(4-homopiperidinonaphthyl-1)-propanal, b.p. 172°–176°/0.01 mm.; 2-(3-chloro-4-piperidinonaphthyl-1)-propanal, b.p. 190°–200°/0.01 mm.; 2-(3-methyl-4-piperidinonaphtyl-1)-propanal, b.p. 170°–175°/0.01 mm.; (+)-2-(4-piperidinonaphthyl-1)-propanal; (−)-2-(4-piperidinonaphthyl-1)-propanal; 2-(4-piperidinonaphthyl-1)-butanal, b.p. 180°–186°/0.02 mm.

EXAMPLE 2 a. A solution of 9 g. of the ethyl ester of 2-(4-piperidinonaphthyl-1)-acrylic acid (obtainable by splitting off water from the ethyl ester of 2-hydroxy-2-(4-piperidinonaphthyl-1)-propionic acid) is gradually added dropwise, at room temperature, to 1.1 g. of LiAlH₄ in 100 ml. of absolute THF. Thereafter, the reaction mixture is boiled for 18 hours. Excess LiAlH₄ is destroyed with ethyl acetate, and the reaction mixture is mixed with a 20% NaOH solution. After the usual work-up operation, the thus-obtained 2-(4-piperidinonaphthyl-1)-propanal (b.p. 160°–170°/0.01 mm.) is converted, by shaking with aqueous NaHSO₃ solution, into the bisulfite compound; m.p. 105°–120° (from ethanol).

Analogously, the corresponding aldehydes 1a are obtained by reduction with LiAlH₄ of the following compounds:

2-(3-fluoro-4-piperidinophenyl)-acrylic acid ethyl ester;
2-(3-chloro-4-piperidinophenyl)-acrylic acid ethyl ester;
2-(3-bromo-4-piperidinophenyl)-acrylic acid ethyl ester;
2-(3-Iodo-4-piperidinophenyl)-acrylic acid ethyl ester;
2-(3-methyl-4-piperidinophenyl)-acrylic acid ethyl ester;
2-(3-ethyl-4-piperidinophenyl)-acrylic acid ethyl ester;
2-(3-trifluoromethyl-4-piperidinophenyl)-acrylic acid ethyl ester
2-(3-methylmercapto-4-piperidinophenyl)-acrylic acid ethyl ester;
2-(3-ethylmercepto-4-piperidinophenyl)-acrylic acid ethyl ester;
2-(3-fluoro-4-pyrrolidinophenyl)-acrylic acid ethyl ester;
2-(3-chloro-4-pyrrolidinophenyl)-acrylic acid ethyl ester;
2-(3-bromo-4-pyrrolidinophenyl)-acrylic acid ethyl ester;
2-(3-methyl-4-pyrrolidinophenyl)-acrylic acid ethyl ester;
2-(3-fluoro-4-homopiperidinophenyl)-acrylic acid ethyl ester;
2-(3-chloro-4-homopiperidinophenyl)-acrylic acid ethyl ester;
2-(3-bromo-4-homopiperidinophenyl)-acrylic acid ethyl ester;
2-(3-methyl-4-homopiperidinophenyl)-acrylic acid ethyl ester;
2-(3-fluoro-4-piperidinophenyl)-crotonic acid ethyl ester;
2-(3-chloro-4-piperidinophenyl)-crotonic acid ethyl ester;
2-(3-bromo-4-piperidinophenyl)-crotonic acid ethyl ester;
2-(3-methyl-4-piperidinophenyl)-crotonic acid ethyl ester;
2-(3-chloro-4-piperidinonaphthyl-1)-acrylic acid ethyl ester;
2-(3-methyl-4-piperidinonaphthyl-1)-acrylic acid ethyl ester; and
2-(4-piperidinonaphthyl-1)-crotonic acid ethyl ester.

In place of the ethyl esters, other lower-alkyl esters of the basic acids can be employed, for example, the methyl esters isopropyl esters, or n-butyl esters.

b. 5.4 g. of 2-(4-piperidinonaphthyl-1)-propanal is boiled for 6 hours with 100 ml. of absolute benzene, 2.5 g. of ethylene glycol and 0.2 g. of p-toluenesulfonic acid with a water trap being employed to remove the water of reaction. After cooling, the benzene phase is washed neutral with 1N sodium hydroxide and water, dried, and evaporated. The residue is chromatographed over silica gel with benzene/petroleum ether, 9 : 1. The first fractions are evaporated, and the residue is distilled, thus obtaining 2-(4-piperidinonaphthyl-1)-propanal-ethyleneacetal, b.p. 180°–185°/0.01 mm.

Analogously, the following compounds are obtained from the corresponding aldehydes by acetalization with ethylene glydol 3-fluoro-4-piperidinophenylacetaldehyde-ethyleneacetal, b.p. 110°–112°/0.02 mm.;
3-chloro-4-piperidinophenylacetaldehyde-ethyleneacetal, b.p. 120°–125°/0.02 mm.;
3-bromo-4-piperidinophenylacetaldehyde-ethyleneacetal, b.p. 140°–144°/0.05 mm.;
3-methyl-4-piperidino-phenylacetaldehyde-ethyleneacetal, b.p. 122°–125°/0.01 mm.;
3-trifluoromethyl-4-piperidinophenylacetaldehyde-ethyleneacetal, b.p. 151°–153°/0.1 mm.;
2-(3-fluoro-4-piperidinophenyl)-propanal-ethyleneacetal, b.p. 124°–130°/0.01 mm.;
2-(3-chloro-4-piperidinophenyl)-propanal-ethyleneacetal, b.p. 137°–139°/0.01 mm.;
2-(3-bromo-4-piperidinophenyl)-propanal-ethyleneacetal, b.p. 155°–160°/0.01 mm.;
2-(3-iodo-4-piperidinophenyl)-porpanal-ethyleneacetal, b.p. 189°–195°/0.01 mm.;
2-(3-nitro-4-piperidinophenyl)-propanal-ethyleneacetal, b.p. 187°–191°/0.01 mm.;
2-(3-methyl-4-piperidino-phenyl)-propanal-ethyleneacetal, b.p. 140°/0.05 mm.;
2-(3-ethyl-4-piperidinophenyl)-propanal-ethyleneacetal, b.p. 156°–160°/0.01 mm.;
2-(3-trifluoromethyl-4-piperidinophenyl)-propanal-ethyleneacetal, b.p. 147°–150°/0.03 mm.;
2-(3-methylmercapto-4-piperidinophenyl)-propanal-ethyleneacetal, b.p. 163°–166°/0.02 mm.;
2-(3-ethyl—mercapto-4-piperidinophenyl)-propanal-ethyleneacetal, b.p. 178°–182°/0.01 mm.;
2-(3-fluoro-4-piperidinophenyl)-butanal-ethyleneacetal, b.p. 147°–151°/0.05 mm.;
2-(3-chloro-4-piperidinophenyl)-butanal-ethyleneacetal, b.p. 155°–160°/0.02 mm.;
2-(3-bromo-4-piperidinophenyl)-butanal-ethyleneacetal, b.p. 170°–175°/0.01 mm.;
2-(3-methyl-4-piperidinophenyl)-butanal-ethyleneacetal, b.p. 156°–157°/0.01 mm.;
4-piperidinonaphthyl-1-acetaldehyde-ethyleneacetal, b.p. 161°–165°/0.01 mm;
2-(3-chloro-4-piperidinonaphthyl-1)-propanal-ethyleneacetal,
2-(3-methyl-4-piperidinonaphthyl-1)-propanal-ethyleneacetal; and
2-(4-piperidinonaphthyl-1)-butanal-ethyleneacetal.

c. A mixture of 10 g. of 2-(4-piperidinonaphthyl-1)-propanal dissolved in 150 ml. of absolute methanol together with 500 mg. of p-toluenesulfonic acid is boiled for 10 hours, using a water trap. A mixture of water/methanol/benzene separates in the water trap during this step and the amount withdrawn is replaced by equal amounts of dry solvent. After the usual work-up operation (pH 10), 2-(4-piperidinonaphthyl-1)-propanal-dimethylacetal is obtained, b.p. 169°–175°/0.01 mm.

Analogously, the following compounds are obtained from the corresponding aldehydes by acetalization with methanol:
3-fluoro-4-piperidinophenylacetaldehyde-dimethylacetal,
3-chloro-4-piperidinophenylacetaldehyde-dimethylacetal,
3-bromo-4-piperidinophenylacetaldehyde-dimethylacetal,
3-methyl-4-piperidinophenylacetaldehyde-dimethylacetal,
3-trifluoromethyl-4-piperidinophenylacetaldehyde-dimethylacetal,
2-(3-fluoro-4-piperidinophenyl)-propanal-dimethylacetal,
2-(3-chloro-4-piperidinophenyl)-propanal-dimethylacetal,
2-(3-bromo-4-piperidinophenyl)-propanal-dimethylacetal,
2-(3-iodo-4-piperidinophenyl)-propanal-dimethylacetal,
2-(3-nitro-4-piperidinophenyl)-propanal-dimethylacetal,
2-(3-methyl-4-piperidinophenyl)-propanal-dimethylacetal,
2-(3-ethyl-4-piperidinophenyl)-propanal-dimethylacetal,
2-(3-trifluoromethyl-4-piperidinophenyl)-propanal-dimethylacetal,
2-(3-methylmercapto-4-piperidinophenyl)-propanal-dimethylacetal,
2-(3-ethylmercapto-4-piperidinophenyl)-propanal-dimethylacetal,
2-(3-fluoro- 4-piperidinophenyl)-butanal-dimethylacetal,
2-(3-chloro-4-piperidinophenyl)-butanal-dimethylacetal,
2-(3-bromo-4-piperidinophenyl)-butanal-dimethylacetal,
2-(3-methyl-4-piperidinophenyl)-butanal-dimethylacetal,
4-piperidinoaphenyl-1-acetaldehyde-dimethylacetal,
2-(3-chloro-4-piperidinonaphthyl-1)-propanal-dimethylacetal,
2-(3-methyl-4-piperidinonaphthyl-1)-propanal-dimethylacetal,
2-(4-piperidinonaphthyl-1)-butanal-dimethylacetal.

d. 15.5 g. of 2-(4-piperidinonaphthyl-1)-propanal-dimethylacetal together with 6.2 g. of ethylene glycol and 1. g. of p-toluenesulfonic acid in 150 ml. of absolute toluene is boiled under reflux. During this time, the toluene which distills off, together with the methanol produced during the transacetalization, is replaced by absolute toluene. As soon as the distilled-off toluene no longer contains methanol, after the usual work-up operation, there is obtained 2-(4-piperidinonaphthyl-1)-propanal-ethyleneacetal, b.p. 180°–185°/0.01 mm.

e. 10.5 g. of 2-(4-piperidinonaphthyl-1)-propanal is boiled for 8 hours in 200 ml. of acetone dimethyl ketal with 2 g. of p-toluenesulfonic acid, the thus-liberated acetone being removed from the reaction mixture through a distillation column. After the usual work-up operation and fractional distallation, 2-(4-piperidinonaphthyl-1)-propanal-dimethylacetal is obtained, b.p. 169°–175°/0.01 mm.

EXAMPLE 3 a. A solution of 25.5 g. of lithium aluminum-tri-tert.-butoxyhydride in 150 ml. of absolute diglyme is added dropwise, within 1 hour, to a solution of 27.3 g. of 2-(3-chloro-4-piperidinophenyl)-propionyl chloride in 100 ml. of absolute diglyme, at −70° to −30° under agitation and introduction of dry nitrogen. The temperature of the reaction mixture is allowed to rise to room temperature within one hour. The reaction solution is poured on ice and worked up as usual. 2-(3-chloro-4-piperidinophenyl)-propanal is obtained, b.p. 135°–140°/0.05 mm.

Analogously, from the corresponding acid chlorides set forth in Example 1, the aldehydes described therein are obtained, and from them, by reaction with NaHSO₃, the corresponding bisulfite compounds are producted, e.g.:
3-fluoro-4-piperidinophenylacetaldehyde sodium bisulfite addition product;
3-chloro-4-piperidinophenylacetaldehyde sodium bisulfite addition product, m.p. 185°;
2-(3-fluoro-4-piperidinophenyl)-propanal sodium bisulfite addition product, m.p. 190°–192°;
2-(3-chloro-4-piperidinophenyl)-propanal sodium bisulfite addition product, m.p. 185°–190°;
2-(3-bromo-4-piperidinophenyl)-propanal sodium bisulfite addition product, m.p. 193°–195°;
2-(3-iodo-4-piperidinophenyl)-propanal sodium bisulfite addition product, m.p. from 190°;
2-(3-methyl-4-piperidinophenyl)-propanal sodium bisulfite addition product, m.p. 172°–175°;
2-(3-ethyl-4-piperidinophenyl)-propanal sodium bisulfite addition product;

2-(3-methylmercapto-4-piperidinophenyl)-propanal sodium bisulfite addition product;
2-(3-ethylmercapto-4-piperidinophenyl)-propanal sodium bisulfite addition product;
(+)-2-(3-chloro-4-piperidinophenyl)-pronanal sodium bisulfite addition product;
(−)-2-(3-chloro-4-piperidinophenyl)-propanal sodium bisulfite addition product;
2-(3-fluoro-4-piperidinophenyl)-butanal sodium bisulfite addition product;
2-(3-chloro-4-piperidinophenyl)-butanal sodium bisulfite addition product, m.p. 170°–171°;
2-(3-bromo-4-piperidinophenyl)-butanal sodium bisulfite addition product;
2-(4-piperidinonaphthyl-1)-acetaldehyde sodium bisulfite addition product;
2-(4-piperidinonaphthyl-1)-propanal sodium bisulfite addition product, m.p. 105°–120°;
2-(3-methyl-4-piperidinonaphthyl-1)-propanal sodium bisulfite addition product; 2-(3-chloro-4-piperidinonaphthyl-1)-propanal sodium bisulfite addition product.

b. 8.5 g. of the sodium bisulfite addition product of 2-(3-fluoro-4-piperidinophenyl)-propanal is suspended in 150 ml. of 1.0N hydrochloric acid and heated for 30 minutes in a water bath. After the usual work-up operation (pH 5.5), 2-(3-fluoro-4-piperidinophenyl)-propanal is obtained, b.p. 115°–118°/0.03 mm.

Analogously, the other sodium bisulfite addition products set forth above can be converted into the corresponding free aldehydes.

c. 6.2 g. of 2-(3-chloro-4-piperidinophenyl)-propanal is heated together with 1.75 g. of hydroxylamine hydrochloride and 2.1 g. of anhydrous sodium acetate in 20 ml. of ethanol for 1.5 hours on a water bath. After removal of the alcohol and the usual work-up operation, 2-(3-chloro-4-piperidinophenyl)-propanaloxime is obtained, m.p. 57°–59° (petroleum ether).

Analogously, the following compounds are obtained from the corresponding aldehydes:
2-(3-fluoro-4-piperidinophenyl)-acetaldoxime;
2-(3-chloro-4-piperidinophenyl)-acetaldoxime;
2-(3-fluoro-4-piperidinophenyl)-propanal-oxime;
2-(3-bromo-4-piperidinophenyl)-propanal-oxime;
2-(3-methyl-4-piperidinophenyl)-propanal-oxime, b.p. 165°–170°/0.05 mm.; and
2-(4-piperidinonaphthyl-1)-propanal-oxime.

EXAMPLE 4 a. To a solution of 7.3 g. of diisobutyl aluminum hydride in 150 ml. of absolute hexane, 17 g. of 2-(3-bromo-4-piperidinophenyl)-propionic acid propyl ester is added dropwise at −70° within 1 hour. Thereafter, the reaction mixture is stirred for another hour at −70°, and then decomposed by the addition of an aqueous NH₄Cl solution. The hexane phase is separated and the aqueous phase extracted with ether. The ether/hexane solution is dried and evaporated. The residue is chromatographed on a silica gel column with benzene/hexane (9 : 1), and from the main fraction, 2-(3-bromo-4-piperidinophenyl)-propanal is obtained; b.p. 160°–165°/0.01 mm.

b. 14.5 g. of 2-(3-bromo-4-piperidinophenyl)-propanal is shaken for 30 minutes in 100 ml. of 5 percent aqueous sulfurous acid. Then, the solution is neutralized by the addition of 120 ml. of 1N NaOH solution, and the thus-formed bisulfite compound is precipitated by the addition of a small amount of ethanol. The reaction mixture is allowed to crystallize overnight, yielding the bisulfite compound of 2-(3-bromo-4-piperidinophenyl)-propanal, m.p. 193°–195°.

EXAMPLE 5

To a solution of 14 g. of N-[α-(3-chloro-4-piperidinophenyl)-propionyl]-aziridine (produced by reacting 2-(3-chloro-4-piperidinophenyl)-propionic acid chloride with ethylenimine in 400 ml. of absolute ether, 30 ml. of a 1.1-molar ethereal LiAlH₄ solution is added dropwise at 0° within 20 minutes. The reaction mixture is agitated at 0° for 1.5 hours and then hydrolyzed by the addition of dilute sulfuric acid.

After the usual work-up operation (pH 5.5), 2-(3-chloro-4-piperidinophenyl)-propanal is obtained, b.p. 135°–140°/0.05 mm.

EXAMPLE 6

11.3 g. of 2-(3-chloro-4-piperidinophenyl)-propionitrile in 150 ml. of absolute ether is added dropwise over a period of 35 minutes to a solution of 7.5 g. of diisobutyl aluminum hydride in 150 ml. of absolute ether, under an N₂ atmosphere and at room temperature. The reaction mixture is stirred for 2 hours at room temperature and then decomposed with aqueous ammonium chloride solution. After the usual work-up operation, 2-(3-chloro-4-piperidinophenyl)-propanal is obtained as the main fraction, b.p. 135°–140°/0.05 mm.

EXAMPLE 7

11.4 g. of 2-(3-chloro-4-aminophenyl)-propanal-ethyleneacetal (produced by acid-catalyzed rearrangement of 2-(3-chloro-4-nitrophenyl)-1,2-propanediol, conversion of the thus-obtained 2-(3-chloro-4-nitrophenyl)-propanal into the ethyleneacetal, and catalytic hydrogenation under neutral conditions) is dissolved in 200 ml. of ethyl acetate, mixed with 5 g. of freshly distilled glutaric dialdehyde, and hydrogenated on PtO₂ at 50°. After the absorption of hydrogen is terminated and the usual work-up operation, 2-(3-chloro-4-piperidinophenyl)-propanal-ethyleneacetal is obtained, b.p. 137°–139°/0.01 mm.

EXAMPLE 8

Nine grams of 2-[3-methyl-4-(4-oxopiperidino)-phenyl]-propanal-ethyleneacetal (obtainable by reacting 2-(3-methyl-4-aminophenyl)-propanal-ethyleneacetal with 2 mols of the ethyl ester of acrylic acid, intramolecular ester condensation, saponification and decarboxylation) is dissolved in 30 ml. of n-butanol and 1 g. of anhydrous hydrazine is added. The reaction mixture is heated for 30 minutes on a water bath. Thereafter, the n-butanol is distilled off, the residue is mixed with 100 ml. of toluene and 4 g. of potassium-tert.-butylate, and boiled until the evolution of gas is terminated. After the usual work-up operation (pH 5.5), 2-(3-methyl-4-piperidinophenyl)-propanalethyleneacetal is obtained, b.p. 140°/0.05 mm.

EXAMPLE 9

12.5 g. of 2-(3-methyl-4-piperidinophenyl-acrolein-ethylene-acetal (obtainable by oxidation of 2-(3-methyl-4-piperidinophenyl)-2-propen-1-ol to the aldehyde, and acetalization) is hydrogenated in 100 ml. of absolute ethanol with 4 g. of 5% Pd-C catalyst until the absorption of hydrogen is terminated. The catalyst is filtered off. After the usual work-up operation, 2-(3-methyl-4-piperidinophenyl)-propanal-ethyleneacetal is obtained b.p. 140°/0.05 mm.

EXAMPLE 10

14.1 g. of 2-[3-methyl-4-(2-oxopiperidino)-phenyl]-propanal-ethyleneacetal [obtainable by reacting 2-(4-amino-3-methylphenyl)-propanol with w-bromovaleric acid chloride and oxidation and acetalization of the thus-obtained 2-[3-methyl-4-(2-oxopiperidino)-phenyl]-propanol] is dissolved in 100 ml. of absolute THF and added dropwise to a suspension of 2.5 g. of LiAlH₄ in 30 ml. of absolute THF. The reaction mixture is boiled for 12 hours.

Ten ml. of 20% NaOH solution is added to the reaction mixture, and, after the usual work-up operation, 2-(3-methyl-4-piperidinophenyl)-propanal-ethyleneacetal is obtained, b.p. 140°/0.05 mm.

EXAMPLE 11

14.5 g. of 4-(3-chloro-4-piperidinophenyl)-2-pentenic acid (obtainable by reacting 3-chloro-4-piperidinoacetophenene with acrylonitrile in the presence of triphenylphosphine and subsequent saponification of the thus-obtained 4-(3-chloro-4-piperidinophenyl)2-pentenic acid nitrile) is dissolved in 150 ml. of absolute $CH_2Cl_2$. At −70°, a 3% ozone/oxygen mixture is introduced into the reaction mixture until a dilute bromine solution is no longer decolorized by the reaction solution. The reaction mixture is gently evaporated, and the residue is stirred in 100 ml. of glacial acetic acid with 5 g. of zinc dust for 4 hours at room temperature. The solid inorganic components are filtered offi After the usual work-up operation, 2-(3-chloro-4-piperidinophenyl)-propanal is produced, b.p. 135°–140°/0.05 mm.

EXAMPLE 12

A solution of 23 g. of 3-methyl-4-piperidinostyrene (obstainable by reducing 3-methyl-4-piperidinoacetophenone with $NaBH_4$ and dehydrating the thus-obtained 1-(3-methyl-4-piperidinophenyl)-ethanol with polyphosphoric acid) and 15 g. of $Co_2(CO)_8$ (dicobalt octacarbonyl) in 250 ml. of ether is shaken with a mixture of carbon monoxide and hydrogen (1 : 1) for 8 hours in an autoclave at 140 atmospheres and 120°. After cooling and removal of the solvent, as well as of the catalyst, the residue is subjected to fractional distallation, thus obtaining 2-(3-methyl-4-piperidinophenyl)-propanal, b.p. 108°–110°/0.01 mm.

EXAMPLE 13

12 g. of 2-(3-nitro-4-piperidinophenyl)-propanal is allowed to stand for 4 hours at room temperature in 100 ml. of DMSO and 100 ml. of benzene, together with 12.4 g. of dicylohexyl carbodiimide, 3.2 g. of pyridine and 1.54 ml. of trifluoroacetic acid. The reaction mixture is diluted with benzene, the precipitated dicyclohexyl urea is filtered off, the filtrate is washed several times with water, and evaporated. The crude 2-(3-nitro-4-piperidinophenyl)-propanal remaining as the residue is shaken with aqueous $NaHSO_3$ solution and allowed to stand for 24 hours at 0°. The thus-precipitated bisulfite addition compound of 2-(3-nitro-4-piperidinophenyl)-propanal is vacuum-filtered and washed with a small amount of ethanol, water and ether.

Analogously, by oxidation with dicyclohexyl carbodiimide/DMSO, the corresponding aldehydes are produced from the following compounds:

2-(3-fluoro-4-piperidinophenyl)-ethanol
2-(3-chloro-4-piperidinophenyl)-ethanol
2-(3-bromo-4-piperidinophenyl)-ethanol
2-(3-methyl-4-piperidinophenyl)-ethanol
2-(3-methyl-4-piperidinophenyl)-ethanol
2-(3-trifluoromethyl-4-piperidinophenyl)-ethanol
2-(3-fluoro-4-piperidinophenyl)-propanol
2-(3-chloro-4-piperidinophenyl)-propanol
2-(3-bromo-4-piperidinophenyl)-propanol
2-(3-iodo-4-piperidinophenyl)-propanol
2-(3-methyl-4-piperidinophenyl)-propanol
2-(3-ethyl-4-piperidinophenyl)-propanol
2-(3-trifluoromethyl-4-piperidinophenyl)-propanol
2-(3-methylmercapto-4-piperidinophenyl) propanol
2-(3-ethylmercapto-4-piperidinophenyl)-propanol
(+)-2-(3-fluoro-4-piperidinophenyl)-propanol
(−)-2-(3-fluoro-4-piperidinophenyl)-propanol
(+)-2-3-bromo-4-piperidinophenyl)-propanol
(−)-2-(3-bromo-4-piperidinophenyl)-propanol
(+)-2-(3-methyl-4-piperidinophenyl)-propanol
(−)-2-(3-methyl-4-piperidinophenyl)-propanol
(+)-2-(3-ethylmercapto-4-piperidinophenyl)-propanol
(−)-2-(3-ethylmercapto-4-piperidinophenyl)-propanol
2-(3-chloro-4-pyrrolidinophenyl)-propanol
2-(3-bromo-4-pyrrolidinophenyl)-propanol
2-(3-methyl-4-pyrrolidinophenyl)-propanol
2-(3-methylmercapto-4-pyrrolidinophenyl)-propanol
2-(3-ethylmercapto-4-pyrrolidinophenyl)-propanol
2-(3-chloro-4-homopiperidinophenyl)-propanol
2-(3-bromo-4-homopiperidinophenyl)-propanol
2-(3-ethylmercapto-4-homopiperidinophenyl)-propanol
2-(3-chloro-4-piperidinophenyl)-butanol
2-(3-bromo-4-piperidinophenyl)-butanol
2-(3-methyl-4-piperidinophenyl)-butanol
2-(3-mthylmercapto-4-piperidinophenyl)-butanol
2-(4-piperidinonaphthyl-1)-ethanol
2-(4-piperidinonaphthyl-1)-propanol
2-(4-pyrrolidinonaphthyl-1)-propanol
2-(4-homopiperidinonapnthyl-1)-propanol
2-(3-methyl-4-piperidinonaphthyl-1)-propanol
2-(3-chloro-4-piperidinonaphthyl-1)-propanol
(+)-2-(4-piperidinonaphthyl-1)-propanol
(−)-2-(4-piperidinonaphthyl-1)-propanol

EXAMPLE 14

2.3 g. of 2-(3-fluoro-4-piperidinophenyl)-propanol is stirred in 150 ml. of acetonitrile together with 10 g. of active manganese dioxide for 30 hours at room temperature. Thereafter, the reaction mixture is separated from the catalyst and, after the usual work-up operation, 2-(3-fluoro-4-piperidinophenyl)-propanal is obtained, b.p. 115°–118°/0.03 mm.

EXAMPLE 15

20.7 g. of 2-(3-methyl-4-piperidinophenyl)-propanol is dissolved in 200 ml. of absolute $CCl_4$. With the exclusion of moisture and at 0°, a solution of 9.1 g. of $CrO_3$, 13.5 g. of tert.-butanol and 15.1 g. of $CH_3COOH$ in 150 ml. of absolute $CCl_4$ is gradually added dropwise thereto. The reaction mixture is then allowed to stand for 24 hours at room temperature. Thereafter, a saturated $NaHSO_3$ solution is added dropwise thereto, thus obtaining the bisulfite addition compound of 2-(3-methyl-4-piperidinophenyl)-propanal, m.p. 172°–175°.

EXAMPLE 16 a. 2.5 g. of sodium is dissolved in 75 ml. of absolute ethanol, and under agitation and a nitrogen atmosphere, 32.4 g. of the ethyl ester of 2,3-epoxy-3-(3-chloro-4-piperidinophenyl)-butyric acid is gradually added dropwise thereto, at 20°–25°. (This ethyl ester compound has a boiling point of 185°–193 °/0.01 mm. and is obtainable by reacting 3-nitro-4-chloroacetophenone with piperidine to 3-nitro-4-piperidinoacetophenene (m.p. 92°), reduc-ing the latter to 3-amino-4-piperidinoacetophenone (m.p. 134°–136°) Sandmeyer reaction in the presence of CuCl to 3-chloro-4-piperidinoacetophenone (b.p. 153°–160°/0.2 mm.) and reaction with the ethyl ester of chloroacetic acid in tert.-butanol in the presence of potassium tert.-butylate at 10°–15°.) The reaction mixture is cooled in an ice bath. Two milliliters of $H_2O$ is added dropwise, the reaction mixture is allowed to stand overnight, filtered, washed with ether, then dissolved in 60 ml. of water and 10 ml. of concentrated HCl, and gently heated on a steam bath until the evolution of $CO_2$ has eased. After the usual work-up operation, 2-(3-chloro-4-piperidinophenyl)-propanal is obtained, b.p. 135°–140°/0.01 mm.

Analogously, the corresponding aldehydes are obtained from each of the following compounds:

2,3-epoxy-3-(3-fluoro-4-piperidinophenyl)-propionic acid ethyl ester;
2,3-epoxy-3-(3-chloro-4-piperidinophenyl)-propionic acid ethyl ester;
2,3-epoxy-3-(3-bromo-4-piperidinophenyl)-propionic acid ethyl ester;
2,3-epoxy-3-(3-methyl-4-piperidinophenyl)-propionic acid ethyl ester;
2,3-epoxy-3-(3-trifluoromethyl-4-piperidinophenyl)-propionic acid ethyl ester;
2,3-epoxy-3-(3-fluoro-4-piperidinophenyl)-butyric acid ethyl ester;
2,3-epoxy-3-(3-bromo-4-piperidinophenyl)-butyric acid ethyl ester;

2,3-epoxy-3-(3-iodo-4-piperidinophenyl)-butyric acid ethyl ester;
2,3-epoxy-3-(3-methyl-4-piperidinophenyl)-butyric acid ethyl ester;
2,3-epoxy-3-(3-ethyl-4-piperidinophenyl)-butyric acid ethyl ester;
2,3-epoxy-3-(3-trifluoromethyl-4-piperidinophenyl)-butyric acid ethyl ester;
2,3-epoxy-3-(3-methylmercapto-4-piperidinophenyl)-butyric ethyl ester;
2,3-epoxy-3-(3-ethylmercapto-4-piperidinophenyl)-butyric acid ethyl ester;
2,3-epoxy-3-(3-fluoro-4-piperidinophenyl)-valeric acid ethyl ester;
2,3-epoxy-3-(3-chloro-4-piperidinophenyl)-valeric acid ethyl ester;
2,3-epoxy-3-(3-bromo-4-piperidinophenyl)-valeric acid ethyl ester;
2,3-epoxy-3-(3-methyl-4-piperidinophenyl)-valeric acid ethyl ester;
2,3-epoxy-3-(4-piperidinonaphthyl-1)-propionic acid ethyl ester;
2,3-epoxy-3-(4-piperidinonaphthyl-1)butyric acid ethyl ester;
2,3-epoxy-3-(3-chloro-4-piperidinonaphthyl-1)-butyric acid ethyl ester;
2,3-epoxy-3-(3-methyl-4-piperidinonaphthyl-1)-butyric acid ethyl ester;
2,3-epoxy-3-(4-piperidinonaphthyl-1)-valeric acid ethyl ester.

b. Resolution of 12.5 g. of 2-(3-chloro-4-piperidinophenyl - propanal is boiled in 150 ml. of absolute benzene together with 7 g. of 1,2-ethanedithiol and 1 g. of p-toluenesulfonic acid on a water trap for 12 hours. After cooling and conducting the usual working-up operation, 2-(3-chloro-4-piperidinophenyl-propanal-ethylenethioacetal is obtained, b.p. 150°–154°/0.03 mm.

Analogously, by reaction with 1,2-ethanedithiol, 1,3-propanedithiol, methyl mercaptan or ethyl mercaptan, the following thioacetals are produced from the corresponding aldehydes:

3-fluoro-4-piperidinophenylacetaldehyde-ethylenethioacetal;
3-chloro-4-piperidinophenylacetaldehyde-ethylenethioacetal;
3-bromo-4-piperidinophenylacetaldehyde-ethylenethioacetal;
3-methyl-4-piperidinophenylacetaldehyde-ethylenethioacetal;
3-trifluoromethyl-4-piperidinophenylacetaldehyde-ethylenethioacetal;
2-(3-fluoro-4-piperidinophenyl)-propanal-ethylenethioacetal;
2-(3-chloro-4-piperidinophenyl)-propanal-1,3-propylenethioacetal;
2-(3-chloro-4-piperidinophenyl)-propanal-dimethylmercaptal;
2-(3-chloro-4-piperidinophenyl)-propanal-diethylmercaptal;
2-(3-bromo-4-piperidinophenyl)-propanal-ethylenethioacetal;
2-(3-iodo-4-piperidinophenyl)-propanal-ethylenethioacetal;
2-(3-methyl-4-piperidinophenyl)-propanal-ethylenethioacetal;
2-(3-ethyl-4-piperidinophenyl)-propanal-ethylenethioacetal;
2-(3-trifluoromethyl-4-piperidinophenyl)-propanal-ethylene-thioacetal;
2-(3-methylmercapto-4-piperidinophenyl)-propanal-ethylene-thioacetal;
2-(3-ethylmercapto-4-piperidinophenyl)-propanal-ethylene- thioacetal;
2-(3-fluoro-4-piperidinophenyl-butanal-ethylenethioacetal;
2-(3-chloro-4-piperidinophenyl)-butanal-ethylenethioacetal;
2-(3-bromo-4-piperidinophenyl)-butanal-ethylenethioacetal;
2-(3-methyl-4-piperidinophenyl)-butanal-ethylenethioacetal;
4-piperidinonaphthyl-1-acetaldehyde-ethylenethioacetal;
2-(4-piperidinonaphthyl-1)-propanal-ethylenethioacetal;
2-(3-chloro-4-piperidinonaphthyl-1)-propanal-ethylenethioacetal;
2-(3-methyl-4-piperidiaonaphthyl-1)-propanal-ethylenethioacetal;
2-(4-piperidinonaphthyl-1)-butanal-8thylenethi acetal.

EXAMPLE 17

1.5 g. of 2-oxo-3-(3-chloro-4-piperidinophenyl)-butyric acid (obtainable by oxidizing 2-oxo-3-(3-chloro-4-piperidinophenyl)-butane with $KMnO_4$) is heated in 5 ml. of aniline to 140° until the evolution of $CO_2$ has terminated. After cooling, the reaction mixture is mixed with 15 ml. of water, adjusted to a pH of 3.5 with hydrochloric acid, heated for 10 minutes on a water bath in order to split the anilide formed as an intermediate product, and then extracted with ether. The usual work-up operation yields 2-(3-chloro-4-piperidinophenyl)-propanal, b.p. 135°–140°/0.05 mm.

EXAMPLE 18 a. 9.5 g. of 2-(3-methyl-4-piperidinophenyl)-2-methyl-ethylene oxide (m.p. 202-204°; obtainable by reacting 3-methyl-4-piperidinoacetophenone with methyl magnesium iodide, dehydration of the 2-(3-methyl-4-piperidinophenyl)-propanol-(2) with polyphosphoric acid to 2-(3-methyl-4-piperidinophenyl)-propene and treatment with m-chloroperbenzoic acid) is gently heated in 25 ml. of THF and 50 ml. of saturated aqueous $NaHSO_3$ solution on a steam bath. The reaction solution is shaken for 1 hour with frequent heating on the steam bath. Water is then added, the reaction mixture is filtered, and the bisulfite addition compound of 2-(3-methyl-4 -piperidinophenyl)-propanal is obtained, m.p. 172°–175°.

b. Ten grams of 2-(3-methyl-4-piperidinophenyl)-2-methyl-ethylene oxide is heated in 50 ml. of THF and 150 ml. of 10 percent hydrochloric acid for 1 hour to 50°. After conducting the usual work-up operation (pH 5.0), 2-(3-methyl-4-piperidinophenyl)-propanal is obtained, b.p. 108°–110°/0.01 mm.

EXAMPLE 19 a. Nine grams of 2-(3-methyl-4-piperidinophenyl)-1,2-propanediol (obtainable by reducing the ethyl ester of 2-hydroxy-2-(3-methyl-4-piperidinophenyl-propionic acid with $LiAlH_4$) and 1 g. of p-toluenesulfonic acid are boiled in 100 ml. of absolute toluene for 1 hour with the use of a water trap. The reaction solution is washed first with an aqueous solution of sodium bicarbonate and then with water, dried, and evaporated. The residue is distilled, thus obtaining 2-(3-methyl-4-piperidinophenyl)-propanal, b.p. 108°–110°/0.01 mm.

In place of p-toluenesulfonic acid, benzenesulfonic acid, sulfuric acid or phosphoric acid can be employed.

Analogously, the corresponding aldehydes are obtained, by rearranging the following compounds in the presence of strong acids:

1-(3-fluoro-4-piperidinophenyl)-1,2-ethanediol;
1-(3-chloro-4-piperidinophenyl)-1,2-ethanediol;
1-(3-bromo-4-piperidinophenyl)-1,2-ethanediol;
1-(3-methyl-4-piperidinophenyl)-1,2-ethanediol;
1-(3-trifluoromethyl-4-piperidinophenyl)-1,2-ethanediol;
2-(3-fluoro-4-piperidinophenyl)-1,2-propanediol;
2-(3-chloro-4-piperidinophenyl)-1,2-propanediol;
2-(3-bromo-4-piperidinophenyl)-1,2-propanediol;
2-(3-iodo-4-piperidinophenyl)-1,2-propanediol;
2-(3-ethyl-4-piperidinophenyl)-1,2-propanediol;
2-(3-fluoromethyl-4-piperidinophenyl)-1,2-propanedial;

2-(3-methylmercapto-4-piperidinophenyl)-1,2-propanediol;
2-(3-ethylmercapto-4-piperidinophenyl)-1,2-propanediol;
2-(3-fluoro-4-piperidinophenyl)-1,2-butanediol;
2-(3-chloro-4-piperidinophenyl)-1,2-butanediol;
2-(3-bromo-4-piperidinophenyl)-1,2-butanediol;
2-(3-methyl-4-piperidinophenyl)-1,2-butanediol;
1-(4-piperidinonaphthyl-1)-1,2-ethanediol;
2-(4-piperidinonaphthyl-1)-1,2-propanediol;
2-(3-chloro-4-piperidinonaphthyl-1)-1,2-propanediol;
2-(3-methyl-4-piperidinonaphthyl-1)-1,2-propanediol; and
2-(4-piperidinonaphthyl-1)-1,2-butanediol.

b. To a solution of 0.4 g. of semicarbazide hydrochloride, 0.6 g. of anhydrous sodium acetate and 4 ml. of water, 0.4 g. of 2-(3-methyl-4-piperidinophenyl)-propanal is added. Such an amount of ethanol sufficient to obtain a clear solution is added, and the latter is heated for 30 minutes on a water bath, cooled, filtered, and the semicarbazone of 2-(3-methyl-4-piperidinophenyl)-propanal is obtained, m.p. 170°–171° (ethyl acetate).

Analogously, the following compounds are obtained from the corresponding aldehydes:

2-(3-fluoro-4-piperidinophenyl)-acetaldehyde-semicarbazone
2-(3-chloro-4-piperidinophenyl)-acetaldehyde-semicarbazone
2-(3-fluoro-4-piperidinophenyl)-propanal-semicarbazone
2-(3-chloro-4-piperidinophenyl)-propanal-semicarbazone
2-(3-bromo-4-piperidinophenyl)-propanal-semicarbazone
2-(4-piperidinonaphthyl-1)-propanal-semicarbazone.

c. A solution of 1 g. of 2-(3-methyl-4-piperidinophenyl)-propanal in 40 ml. of ethanol is added to a warm solution of 0.8 g. of 2,4-dinitrophenyl hydrazine in 4 ml. of $H_2SO_4$, 6 ml. of $H_2O$ and 20 ml. of ethanol. The reaction solution is allowed to stand for 1 hour at room temperature and, after the usual work-up operation, the 2,4-dinitrophenyl hydrazone of 2-(3-methyl-4-piperidinophenyl)-propanal is obtained, m.p. 135°–136° (ethyl acetate/petroleum ether).

d. 6.5 g. of 2-(3-methyl-4-piperidinophenyl)-propanal is heated with 15 ml. of acetic anhydride and 1 g. of anhydrous sodium acetate for 1 hour on a water bath and then allowed to stand for 24 hours at room temperature. The reaction mixture is mixed with benzene, washed twice with water, and dried. To remove any excess acetic anhydride, the residue is evaporated twice with 50 ml. of absolute benzene under reduced pressure. From the residue, 2-(3-methyl-4-piperidinophenyl)-propanal-diacetate is obtained by fractional distillation, b.p. 130°–135°/0.01 mm.

By acylation of the corresponding aldehyde, the following compounds are analogously obtained:

3-fluoro-4-piperidinophenylacetaldehyde-diacetate
3-chloro-4-piperidinophenylacetaldehyde-diacetate
3-bromo-4-piperidinophenylacetaldehyde-diacetate
3-methyl-4-piperidinophenylacetaldehyde-diacetate
3-trifluoromethyl-4-piperidinophenylacetaldehyde-diacetate
2-(3-fluoro-4-piperidinophenyl)-propanal-diacetate
2-(3-chloro-4-piperidinophenyl)-propanal-diacetate
2-(3-chloro-4-piperidinophenyl)-propanal-dipropionate
2-(3-chloro-4-piperidinophenyl)-propanal-dibutyrate
2-(3-bromo-4-piperidinophenyl)-propanal-diacetate
2-(3-iodo-4-piperidinophenyl)-propanal-diacetate
2-(3-ethyl-4-piperidinophenyl)-propanal-diacetate
2-(3-trifluoromethyl-4-piperidinophenyl)-propanal-diacetate
2-(3-methylmercapto-4-piperidinophenyl)-propanal-diacetate
2-(3-ethylmercapto-4-piperidinophenyl)-propanal-diacetate
2-(3-fluoro-4-piperidinophenyl)-butanal-diacetate
2-(3-chloro-4-piperidinophenyl)-butanal-diacetate
2-(3-bromo-4-piperidinophenyl)-butanal-diacetate
2-(3-methyl-4-piperidinophenyl)-butanal-diacetate
4-piperidinonaphthyl-1-acetaldehyde-diacetate
2-(4-piperidinonaphthyl-1)-propanal-diacetate
2-(3-chloro-4-piperidinonaphthyl-1)-propanal-diacetate
2-(3-methyl-4-piperidinonaphthyl-1)-propanal-diacetate
2-(4-piperidinonaphthyl-1)-butanal-diacetate.

EXAMPLE 20

Fifteen grams of 2-(4-piperiodinonaphthyl-1)-1,2-propanediol (obtainable by reducing the ethyl ester of 2-hydroxy-2-(4-piperidinonaphthyl-1)-propionic acid with Li-$AlH_4$) is dissolved in 100 ml. of formic acid and agitated for 30 minutes at room temperature. Thereafter, the formic acid is distilled off, and the residue is stirred with 150 ml. of water and 15 ml. of concentrated $H_2SO_4$ for 1 hour at room temperature. After conducting the usual working-up operation (pH 7), the crude product is purified by chromatographing over a silica gel column with benzene : petroleum ether (b.p. 50°–70°) 9 : 1. The first fractions are evaporated, and the thus-obtained 2-(4-piperidinonaphthyl-1)-propanal is converted into the bisulfite compound; m.p. 105°–120°.

EXAMPLE 21

9.5 g. of 2-(3-chloro-4-piperidinophenyl)-1,2-butane-diol is heated in 70 ml. of THF and 30 ml. of 25% $H_2SO_4$ for 50 minutes to 80°. After the usual work-up operation (pH 5.5), 2-(3-chloro-4-piperidinophenyl)-butanal is obtained, b.p. 125°–129°/0.03 mm.

EXAMPLE 22 a. Ten grams of crude 1-ethoxy-2-(3-methyl-4-piperidinophenyl)-propanol-(2) (obtainable by reacting 3-methyl-4-piperidinoacetophenone with ethoxymethyl magnesium chloride in THF and subsequent hydrolysis) is boiled for 1 hour with 150 ml. of formic acid. After cooling, the reaction solution is mixed with 100 ml. of 15 percent sulfuric acid and stirred for 3 hours at 50°. After the usual work-up operation, 2-(3-methyl-piperidinophenyl)-propanal is obtained, b.p. 108°–110°/0.01 mm.

Analogously, the corresponding aldehydes are obtained by subjecting the following compounds to an acid treatment:

2-ethoxy-1-(3-fluoro-4-piperidinophenyl)-ethanol;
2-ethoxy-1-(3-chloro-4-piperidinophenyl)-ethanol;
2-ethoxy-1-(4-piperidinenaphthyl-1)-ethanol;
1-ethoxy-2-(3-fluoro-4-piperidinophenyl)-propanol-(2);
1-ethoxy-2-(3-chloro-4-piperidinophenyl)-propanol-(2);
1-ethoxy-2-(3-bromo-4-piperidinophenyl)-propanol-(2);
1-ethoxy-2-(3-iodo-4-piperidinophenyl)-propanol-(2);
1-ethoxy-2-(3-nitro-4-piperidinophenyl)-propanol-(2);
1-ethoxy-2-(3-ethyl-4-piperidinophenyl)-propanol-(2);
1-ethoxy-2-(3-trifluoromethyl-4-piperidinophenyl)-propanol-(2);
1-ethoxy-2-(3-methylmercapto-4-piperidinophenyl)-propanol-(2);
1-ethoxy-2-(3-ethylmercapto-4-piperidinophenyl)-propanol-(2);
1-ethoxy-2-(4-piperidinonaphthyl-1)-propanol-(2).

In place of the ethoxy compounds, it is also possible to employ as the starting compounds other lower-alkyl ethers, such as the methyl ethers, e.g., 1-methoxy-2-(3-methyl-4-piperidinophenyl)-propanol-(2).

b. 13.8 g. of 2-(3-methyl-4-piperidinophenyl)-propanal is heated to the boiling point for 20 minutes, together with 12 g. of orthoformic acid triethyl ester, 0.5 g. of ammonium nitrate, and 5 ml. of absolute ethanol. After cooling, the reaction mixture is filtered, diluted with ether, and the other solution is washed with dilute aqueous ammonia solution. The ether solution is dried, evaporated, and 2-(3-methyl-4-piperidinophenyl)-propanal-diethylacetal is obtained, b.p. 128°–130°/0.01 mm.

Analogously, by reaction with the triethyl ester of orthoformic acid, the following compounds are produced from the corresponding aldehydes:

3-fluoro-4-piperidinophenyl-acetaldehyde-diethylacetal;
3-chloro-4-piperidinophenyl-acetaldehyde-diethylacetal;
3-bromo-4-piperidinophenyl-acetaldehyde-diethylacetal;

3-methyl-4-piperidinophenyl-acetaldehyde-diethylacetal;
3-trifluoromethyl-4-piperidinophenyl-acetaldehyde-diethylacetal;
2-(3-fluoro-4-piperidinophenyl)-propanal-diethylacetal;
2-(3-chloro-4-piperidinophenyl)-propanal-diethylacetal;
2-(3-bromo-4-piperidinophenyl)-propanal-diethylacetal;
2-(3-iodo-4-piperidinophenyl)-propanal-diethylacetal;
2-(3-nitro-4-piperidinophenyl)-propanal-diethylacetal;
2-(3-ethyl-4-piperidinophenyl)-propanal-diethylacetal;
2-(3-trifluoromethyl-4-piperidinophenyl)-propanal-diethylacetal;
2-(3-methylmercapto-4-piperidinophenyl)-propanal-diethylacetal;
2-(3-ethylmercapto-4-piperidinophenyl)-propanal-diethylacetal;
2-(3-fluoro-4-piperidinophenyl)-butanal-diethylacetal;
2-(3-chloro-4-piperidinophenyl)-butanal-diethylacetal;
2-(3-bromo-4-piperidinophenyl)-butanal-diethylacetal;
2-(3-methyl-4-piperidinophenyl)-butanal-diethylacetal;
4-piperidinonaphthyl-1-acetaldehyde-diethylacetal;
2-(4-piperidinonaphthyl-1)-propanal-diethylacetal;
2-(3-chloro-4-piperidinonaphthyl-1)-propanal-diethylacetal;
2-(3-methyl-4-piperidinonaphthyl-1)-propanal-diethylacetal;
2-(4-piperidinonaphthyl-1)-butanal-diethylacetal.

EXAMPLE 23

6.5 g. of 1-ethoxy-2-(3-methyl-4-piperidinophenyl)-propanol (2) is dissolved in 75 ml. of absolute toluene and, after the addition of 150 mg. of p-toluenesulfonic acid, boiled for 1.5 hours. The toluene solution is washed with aqueous NaHCO₃ solution, dried and evaporated, thus obtaining 1-ethoxy-2-(3-methyl-4-piperidino-phenyl)-propene, b.p. 135°-140°10.01 mm. Analogously, from:

1-methoxy-2-(3-fluoro-4-piperidinophenyl)-propanol-(2),
1-ethoxy-2-(3-fluoro-4-piperidinophenyl)-propanol-(2),
1-methoxy-2-(3-chloro-4-piperidinophenyl)-propanol-(2),
1-ethoxy-2-(3-chloro-l4-piperidinophenyl)-propanol-(2),
1-methoxy-2-(3-bromo-4-piperidinophenyl)-propanol-(2),
1-ethoxy-2-(3-bromo-4-piperidinophenyl)-propanol-(2),
1-methoxy-2-(3-methyl-4-piperidinophenyl)-propanol-(2),
1-methoxy-2-(4-piperidinonaphthyl-1)-propanol-(2), and
1-ethoxy-2-(4-piperidinonaphthyl-1)-propanol-(2), the following compounds are obtained by splitting out water with
p-toluenesulfonic acid:

1-methoxy-2-(3-fluoro-4-piperidinophonyl)-propane,
1-ethoxy-2-(3-fluoro-4-piperidinophenyl)-propene,
1-methoxy-2-(3-chloro-4-piperidinophenyl)-propene,
1-ethoxy-2-(3-chloro-4-piperidinophenyl)-propene,
1-methoxy-2-(3-bromo-4-piperidinophenyl)-propene,
1-ethoxy-2-(3-bromo-4-piperidinophenyl)-propene,
1-methoxy-2-(3-methyl-4-piperidinophenyl)-propene,
1-methoxy-2-(4-piperidinonaphthyl-1)-propene, and
1-ethoxy-2-(4-piperidinonaphthyl-1)-propene.

EXAMPLE 24

13.5 g. of 1,2-diethoxy-1-(3-methyl-4-piperidinophenyl)-ethane (produced by reacting 3-methyl-4-piperidinophenyl-magnesium bromide with ethoxy acetaldehyde diethylacetal) is boiled for 3 hours in 250 ml. of THF and 50 ml. of 15% H₂SO₄. The reaction mixture is worked up as usual (pH 5.5), thus obtaining 2-(3-methyl 4-piperidinophenyl)-acetaldehyde, b.p. 105°-110°10.03 mm.

EXAMPLE 25

Eight grams of 1-ethoxy-2-bromo-2-(3-methyl-4-piperidinophenyl)-ethane (obtainable by reacting 2-ethoxy-1-(3-methyl-4-piperidinophenyl)-ethanol with PBr₃ in ether) is dissolved in 100 ml. of absolute benzene and mixed, dropwise, with 12.4 g. of 1,5-diazabicyclo[4,3,0]-nonene-(5), at 0-5°. Thereafter, the reaction mixture is heated for 30 minutes to 60°, poured on ice, and, after the usual work-up operation, 1-ethoxy-2-(3-methyl-4-piperidinophenyl)-ethylene is obtained, b.p. 122°-125°10.01 mm.

EXAMPLE 26 a. Thirty-four grams of 2-(3-chloro-4-aminophenyl)-propanal-ethylene-acetal (obtainable by oxidation of 2-(3-chloro4-nitrophenyl)-propanol with DMSO/dicyclohexyl carbodiimide to the aldehyde, acetalization with ethylene glycol and subsequent hydrogenation on Raney nickel) is heated in 200 ml. of 1,5-dibromopentane, together with 25 g. of potassium carbonate, for 7 hours to 140°. Then, the reaction mixture is cooled, filtered, and evaporated. After chromatographing the residue on silica gel with benzene petroleum ether (9 : 1), 2-(3-chloro-4-piperidinophenyl)-propanal-ethyleneacetal is obtained, b.p. 137°-139°/0.01 mm.

b. One gram of the thus-obtained ethyleneacetal is heated with 5 ml. of 10% hydrochloric acid in 15 ml. of THF for 30 minutes to 60°. After the usual working-up operation, 2-(3-chloro-4-piperidinophenyl)-propanal is obtained, bisulfite addition compound, m.p. 185°-190°.

EXAMPLE 27

13.8 g. of 1-(3-methyl-4-piperidinophenyl)-ethyl bromide (produced by the reaction of 1-(3-methyl-4-piperidinophenyl)-ethanol with HBr in THF) is converted, with 1.3 g. of magnesium filings in 200 ml. of ether, into the Grignard compound. Thereafter, 7.5 g. of the triethyl ester of orthoformic acid is added dropwise within 15 minutes. The reaction mixture is stirred for 10 hours at room temperature. Then, the ether is replaced by benzene, and the reaction mixture is heated for 3 hours to 75°. The reaction mixture is then decomposed with NH₄Cl solution, worked up as usual, and after fractional distillation, 2-(3-methyl-4-piperidinophenyl)-propanal-diethylacetal is obtained, b.p. 128°/0.01 mm.

EXAMPLE 28

A Grignard solution, prepared from 26 g. of 1-(3-methyl-4-piperidinophenyl)-ethyl chloride (obtainable from 3-methyl-4-piperidinoacetophenone by reduction and subsequent reaction with SOCl₂) in 500 ml. of absolute ether, is added dropwise to a solution of 16 g. of ethoxy-methylene aniline in 100 ml. of absolute ether. Thereafter, the reaction mixture is boiled for one-half hour, then the ether is evaporated, and the residue is decomposed with ice and 5N hydrochloric acid. After the usual work-up operation (pH 5 – 6), 2-(3-methyl-4-piperidinophenyl)-propanal is obtained, b.p. 108°-110°/0.01 mm.

EXAMPLE 29 a. To a suspension of 17.1 g. of methoxymethyl-triphenyl-phosphonium chloride in 250 ml. of absolute ether, a solution of 0.05 mol of phenyllithium in 100 ml. of absolute ether is gradually added. After 15 minutes, a solution of 11.5 g. of 3-chloro-4-piperidinoacetophenone in 120 ml. of absolute ether is added dropwise to this reaction mixture, under agitation. The reaction mixture is stirred for 2 hours at room temperature, Then, the reaction mixture is filtered off, the ether solution is washed with water, dried, and evaporated, thus obtaining 1-methoxy-2-(3-chloro-4-piperidinophenyl)-propene, b.p. 128°-132°/ 0.02 mm.

Analogously, 2-(3-chloro-4-piperidinophenyl)-1-p-tolyloxy-propene is obtained with triphenylphosphine-p-tolyloxymethylene (producible in situ from triphenylphosphine and p-tolyloxymethyl chloride).

b. 6.5 g. of 1-methoxy-2-(3-chloro-4-piperidinophenyl)-propene is heated for 10 hours in 75 ml. of acetic acid and 15 ml. of 10% H₂SO₄. After neutralizing the reaction mixture, the latter is extracted with ether, and the ether solution is evaporated. The oily residue is purified over Al₂O₃ with benzene: hexane (1 :11). From the first fractions, 2-)3-chloro- 4-piperidinophenyl)-propanal is obtained, b.p. 135°–140 °/0.01 mm.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A p-aminoarylalkanal of the formula

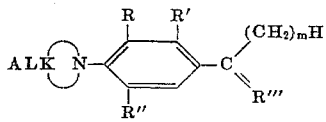

wherein $m$ is 0–2; ALK is alkylene containing four to six carbon atoms in the chain; R and R' are H or, collectively, —CH=CH—CH =CH—; R" is halogen, $NO_2$, $CH_3$, $C_2H_5$, $CF_3$, $CH_3S$, $C_2H_5S$ or, when R and R' collectively are —CH=CH—CH =CH—, H; R''' is (H,CHO), (H,$Y_1$) or $Y_2$, in which $Y_1$ is —CHOH—$SO_3M_1$, —CHOH—OA, —CH(OA)$_2$, —CH(OAc)$_2$, —CHOA—SA, —CH(SA)$_2$ or —CH = NOH, and $Y_2$ is =CHOA, =CHOAc or =CHOAr; $M_1$ being an alkali metal or alkaline earth metal; A being alkyl of one to eight carbon atoms or, when there are two A groups, collectively alkylene of two to four carbon atoms; Ac is the acyl radical of a hydrocarbon carboxylic acid containing one to eight carbon atoms; and Ar is phenyl or naphthyl, said phenyl being substituted by zero to three substituents selected from the group of lower-alkyl, lower-alkoxy and halo.

2. A compound of claim 1 wherein ALK is —(CH$_2$)$_5$—.
3. A compound of claim 1 wherein R''' is (H,CHO).
4. A compound of claim 1 wherein $Y_1$ is —CH(OA)$_2$.
5. A compound of claim 1 wherein $Y_1$ is —CHOH—SO$_3$Na.
6. A compound of claim 1 wherein $m$ is 1.
7. A compound of claim 1 wherein R and R' are H.
8. A compound of claim 1 wherein R" is Cl, Br, I or CH$_3$.
9. A compound of claim 8 wherein ALK is —(CH$_2$)$_5$—, $m$ is 1 and R and R' are H.
10. A compound of claim 3, 2-(3-chloro-4-piperidinophenyl)-propanal.
11. A compound of claim 3, 2-(3-bromo-4-piperidinophenyl)-propanal.
12. A compound of claim 3, 2-(3-methyl-4-piperidinophenyl)-propanal.
13. A compound of claim 5, 2-(3-chloro-4-piperidinophenyl)-propanal sodium bisulfite addition product.
14. A compound of claim 5, 2-(3-bromo-4-piperidinophenyl)-propanal sodium bisulfite addition product.
15. A compound of claim 5, 2-(3-methyl-4-piperidinophenyl)-propanal sodium bisulfite addition product.
16. A compound of claim 4, 2-(3-chloro-4-piperidinophenyl)-propanal-ethyleneacetal.

* * * * *